United States Patent
Lee et al.

(10) Patent No.: US 10,469,358 B2
(45) Date of Patent: Nov. 5, 2019

(54) WIRELESS MULTIHOP RELAY

(71) Applicant: QUALCOMM Incorporated, San Diego, CA (US)

(72) Inventors: Soo Bum Lee, San Diego, CA (US); Gavin Bernard Horn, La Jolla, CA (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 15/879,133

(22) Filed: Jan. 24, 2018

(65) Prior Publication Data
US 2018/0337846 A1 Nov. 22, 2018

Related U.S. Application Data

(60) Provisional application No. 62/508,062, filed on May 18, 2017.

(51) Int. Cl.
*H04L 12/751* (2013.01)
*H04L 12/761* (2013.01)
(Continued)

(52) U.S. Cl.
CPC .......... *H04L 45/02* (2013.01); *H04L 5/0053* (2013.01); *H04L 45/16* (2013.01); *H04L 45/50* (2013.01);
(Continued)

(58) Field of Classification Search
CPC ......... H04B 7/155; H04L 45/02; H04L 45/16; H04L 5/0007; H04L 45/50; H04L 45/507;
(Continued)

(56) References Cited

U.S. PATENT DOCUMENTS 8,107,408 B2 1/2012 Chindapol et al.
8,923,752 B2 12/2014 Morioka et al.
(Continued)

FOREIGN PATENT DOCUMENTS

EP 3136779 A1 3/2017

OTHER PUBLICATIONS

International Search Report and Written Opinion—PCT/US2018/026272—ISA/EPO—dated Jul. 2, 2018.

*Primary Examiner* — Kyaw Z Soe
(74) *Attorney, Agent, or Firm* — Patterson & Sheridan, LLP

(57) ABSTRACT

Certain aspects of the present disclosure relate to methods and apparatus for wirelessly routing packets. One method includes storing a mapping of one or more identifiers to one or more radio bearers associated with one or more destination devices. Each identifier is mapped to at least one radio bearer associated with at least one destination device. The method includes establishing an association with a network node and receiving information indicative of the mapping from the network node. The method includes determining the mapping based on the information indicative of the mapping. The method includes obtaining a first packet containing a first identifier and mapping the first packet to at least a first radio bearer associated with a first destination device based on the mapping and the first identifier. The method includes transmitting the first packet wirelessly over the at least one first radio bearer to the first destination device.

30 Claims, 16 Drawing Sheets

(51) Int. Cl.
*H04W 28/08* (2009.01)
*H04L 12/723* (2013.01)
*H04L 5/00* (2006.01)
*H04B 7/155* (2006.01)
*H04W 92/20* (2009.01)
*H04W 40/12* (2009.01)

(52) U.S. Cl.
CPC ........... *H04W 28/085* (2013.01); *H04B 7/155* (2013.01); *H04L 5/001* (2013.01); *H04L 5/0007* (2013.01); *H04L 45/507* (2013.01); *H04W 40/12* (2013.01); *H04W 92/20* (2013.01)

(58) Field of Classification Search
CPC ... H04L 5/001; H04L 5/0053; H04L 2212/00; H04L 29/12207; H04L 29/12226; H04L 61/20; H04L 61/2015; H04L 69/04; H04L 69/22; H04W 28/085; H04W 40/12; H04W 92/20; H04W 36/0072; H04W 40/22; H04W 40/248; H04W 40/30; H04W 40/32; H04W 84/047; H04W 88/04; H04W 8/26
See application file for complete search history.

(56) References Cited

U.S. PATENT DOCUMENTS

| | | | |
|---|---|---|---|
| 8,982,811 | B2 | 3/2015 | Wang et al. |
| 9,088,939 | B2 | 7/2015 | Ulupinar et al. |
| 9,198,112 | B2 | 11/2015 | Ulupinar et al. |
| 2007/0280172 | A1* | 12/2007 | Tan ...................... H04B 7/2606 370/335 |
| 2009/0190521 | A1* | 7/2009 | Horn .................... H04W 40/248 370/315 |
| 2010/0103845 | A1* | 4/2010 | Ulupinar ........... H04L 29/12207 370/254 |
| 2011/0080836 | A1* | 4/2011 | Bragg .................. H04L 12/413 370/241.1 |
| 2012/0082084 | A1* | 4/2012 | Balakrishnan .... H04W 72/1215 370/315 |
| 2013/0301611 | A1 | 11/2013 | Baghel et al. |
| 2014/0056210 | A1* | 2/2014 | Jafarian ................ H04W 88/04 370/315 |
| 2018/0184359 | A1* | 6/2018 | Hessler ................ H04W 40/22 |
| 2018/0213577 | A1* | 7/2018 | Burbidge .............. H04W 76/10 |

* cited by examiner

900

*906*

| Link Direction | Cell ID | Routing Label | Radio Link | Radio Bearer |
|---|---|---|---|---|
| UL | 1 | R3 | C-RNTI2 | LCID2 |

*922*

| Link Direction | Cell ID | Routing Label | Radio Link | Radio Bearer |
|---|---|---|---|---|
| DL | 1 | R3 | C-RNTI3 | LCID3 |
| UL | 1 | R3 | C-RNTI1 | LCID1 |
| UL | 1 | R2 | C-RNTI1 | LCID1 |

*904*

| Link Direction | Cell ID | Routing Label | Radio Link | Radio Bearer |
|---|---|---|---|---|
| DL | 1 | R3 | C-RNTI2 | LCID2 |
| UL | 1 | R3 | C-RNTIC | LCIDC |
| DL | 1 | R2 | C-RNTI2 | LCID2 |
| UL | 1 | R2 | C-RNTIC | LCIDC |

| Cell ID | Link Direction | Routing Label | Radio Link | Radio Bearer |
|---|---|---|---|---|
| 1 | UL | R32 | C-RNTI2 | LCID2 |

― 1206

| Cell ID | Link Direction | Routing Label | Radio Link | Radio Bearer | Routing Label |
|---|---|---|---|---|---|
| 1 | DL | R21' | C-RNTI3 | LCID3 | R32 |
| 1 | UL | R32 | C-RNTI1 | LCID1 | R21 |
| 1 | UL | R21 | C-RNTI1 | LCID1 | |

― 1222

| Cell ID | Link Direction | Routing Label | Radio Link | Radio Bearer | Routing Label |
|---|---|---|---|---|---|
| 1 | DL | R10 | C-RNTI2 | LCID2 | R21 |
| 1 | UL | R21 | C-RNTIC | LCIDC | R10 |
| 1 | DL | R10' | C-RNTI2 | LCID2 | R21' |

| Cell ID | Link Direction | UID: Routing Label | Radio Link | Radio Bearer |
|---|---|---|---|---|
| 1 | UL | UID:R3 | C-RNTI2 | LCID2 |

1322

| Cell ID | Link Direction | Routing Label | Radio Link | Radio Bearer |
|---|---|---|---|---|
| 1 | DL | R3 | C-RNTI3 | LCID3 |
| 1 | UL | R3 | C-RNTI1 | LCID1 |
| 1 | UL | R2 | C-RNTI1 | LCID1 |

1304

| Cell ID | Link Direction | Routing Label | Radio Link | Radio Bearer |
|---|---|---|---|---|
| 1 | DL | R3 | C-RNTI2 | LCID2 |
| 1 | UL | R3 | C-RNTIC | LCIDC |
| 1 | DL | R2 | C-RNTI2 | LCID2 |
| 1 | UL | R2 | C-RNTIC | LCIDC |

FIG. 13

WIRELESS MULTIHOP RELAY

CROSS-REFERENCE TO RELATED APPLICATIONS

This application claims the benefit of U.S. Provisional Patent No. 62/508,062, filed May 18, 2017. The content of the provisional application is hereby incorporated by reference in its entirety.

Introduction

The present disclosure relates generally to communication systems, and more particularly, to methods and apparatus for wireless multihop relay in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, gigabit NodeB (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wirelessly routing packets. The method includes storing a mapping of one or more identifiers to one or more radio bearers associated with one or more destination devices, wherein each identifier is mapped to at least one radio bearer associated with at least one destination device, wherein each of the one or more identifiers comprises a routing label and a device identifier. The method includes establishing an association with a network node to manage routing traffic. The method includes receiving information indicative of the mapping from the network node. The method includes determining the mapping based on the information indicative of the mapping. The method includes obtaining a first packet containing a first identifier. The method includes mapping the first packet to at least a first radio bearer associated with a first destination device based on the mapping and the first identifier. The method includes transmitting the first packet wirelessly over the at least one first radio bearer to the first destination device.

Certain aspects provide a method for configuring mappings at wireless devices. The method includes receiving a request from a first wireless device. The method includes determining at least one wireless path between a user equipment and an access node via the first wireless device, based on receiving the request. The method includes assigning a first identifier to the first wireless device. The method includes generating routing information for the first wireless device based on the determined at least one wireless path, wherein the routing information comprises one or more identifiers mapped to one or more radio links associated with one or more destination devices, wherein the routing information comprises a first identifier associated with the first wireless device mapped to at least a first radio link associated with a second wireless device. The method includes transmitting the routing information to the first wireless device to provision the first wireless device to route packets along the at least one wireless path.

Certain aspects provide a wireless device comprising a memory configured to store a mapping of one or more identifiers to one or more radio bearers associated with one or more destination devices, wherein each identifier is mapped to at least one radio bearer associated with at least one destination device, wherein each of the one or more identifiers comprises a routing label and a device identifier. The wireless device further comprises a processor coupled to the memory. The processor is configured to establish an association with a network node to manage routing traffic. The processor is configured to receive information indicative of the mapping from the network node. The processor is configured to determine the mapping based on the information indicative of the mapping. The processor is configured to obtain a first packet containing a first identifier. The processor is configured to map the first packet to at least a first radio bearer associated with a first destination device based on the mapping and the first identifier. The processor is configured to transmit the first packet wirelessly over the at least one first radio bearer to the first destination device.

Certain aspects provide a device comprising a memory and a processor coupled to the memory. The processor is configured to receive a request from a first wireless device. The processor is configured to determine at least one wireless path between a user equipment and an access node via the first wireless device, based on receiving the request. The processor is configured to assign a first identifier to the first wireless device. The processor is configured to generate routing information for the first wireless device based on the determined at least one wireless path, wherein the routing information comprises one or more identifiers mapped to one or more radio links associated with one or more destination devices, wherein the routing information comprises a first identifier associated with the first wireless device mapped to at least a first radio link associated with a second wireless device. The processor is configured to transmit the routing information to the first wireless device to provision the first wireless device to route packets along the at least one wireless path.

Certain aspects provide a wireless device. The wireless device includes means for storing a mapping of one or more identifiers to one or more radio bearers associated with one or more destination devices, wherein each identifier is mapped to at least one radio bearer associated with at least one destination device, wherein each of the one or more identifiers comprises a routing label and a device identifier. The wireless device includes means for establishing an association with a network node to manage routing traffic. The wireless device includes means for receiving information indicative of the mapping from the network node. The wireless device includes means for determining the mapping based on the information indicative of the mapping. The wireless device includes means for obtaining a first packet containing a first identifier. The wireless device includes means for mapping the first packet to at least a first radio bearer associated with a first destination device based on the mapping and the first identifier. The wireless device includes means for transmitting the first packet wirelessly over the at least one first radio bearer to the first destination device.

Certain aspects provide a device. The device includes means for receiving a request from a first wireless device. The device includes means for determining at least one wireless path between a user equipment and an access node via the first wireless device, based on receiving the request. The device includes means for assigning a first identifier to the first wireless device. The device includes means for generating routing information for the first wireless device based on the determined at least one wireless path, wherein the routing information comprises one or more identifiers mapped to one or more radio links associated with one or more destination devices, wherein the routing information comprises a first identifier associated with the first wireless device mapped to at least a first radio link associated with a second wireless device. The device includes means for transmitting the routing information to the first wireless device to provision the first wireless device to route packets along the at least one wireless path.

Certain aspects provide a computer readable medium having instructions stored thereon for performing a method for wirelessly routing packets. The method includes storing a mapping of one or more identifiers to one or more radio bearers associated with one or more destination devices, wherein each identifier is mapped to at least one radio bearer associated with at least one destination device, wherein each of the one or more identifiers comprises a routing label and a device identifier. The method includes establishing an association with a network node to manage routing traffic. The method includes receiving information indicative of the mapping from the network node. The method includes determining the mapping based on the information indicative of the mapping. The method includes obtaining a first packet containing a first identifier. The method includes mapping the first packet to at least a first radio bearer associated with a first destination device based on the mapping and the first identifier. The method includes transmitting the first packet wirelessly over the at least one first radio bearer to the first destination device.

Certain aspects provide a computer readable medium having instructions stored thereon for performing a method for configuring mappings at wireless devices. The method includes receiving a request from a first wireless device. The method includes determining at least one wireless path between a user equipment and an access node via the first wireless device, based on receiving the request. The method includes assigning a first identifier to the first wireless device. The method includes generating routing information for the first wireless device based on the determined at least one wireless path, wherein the routing information comprises one or more identifiers mapped to one or more radio links associated with one or more destination devices, wherein the routing information comprises a first identifier associated with the first wireless device mapped to at least a first radio link associated with a second wireless device. The method includes transmitting the routing information to the first wireless device to provision the first wireless device to route packets along the at least one wireless path.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 9 illustrates an example of mappings utilized by wireless devices to determine a next hop destination to forward a packet, in accordance with certain aspects of the present disclosure.

FIG. 12 illustrates an example of mappings utilized by wireless devices to determine a next hop destination to forward a packet in a hop-by-hop routing scheme, in accordance with certain aspects of the present disclosure.

FIG. 13 illustrates an example of mappings utilized by wireless devices to determine a next hop destination to forward a packet in a per-UE routing scheme, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
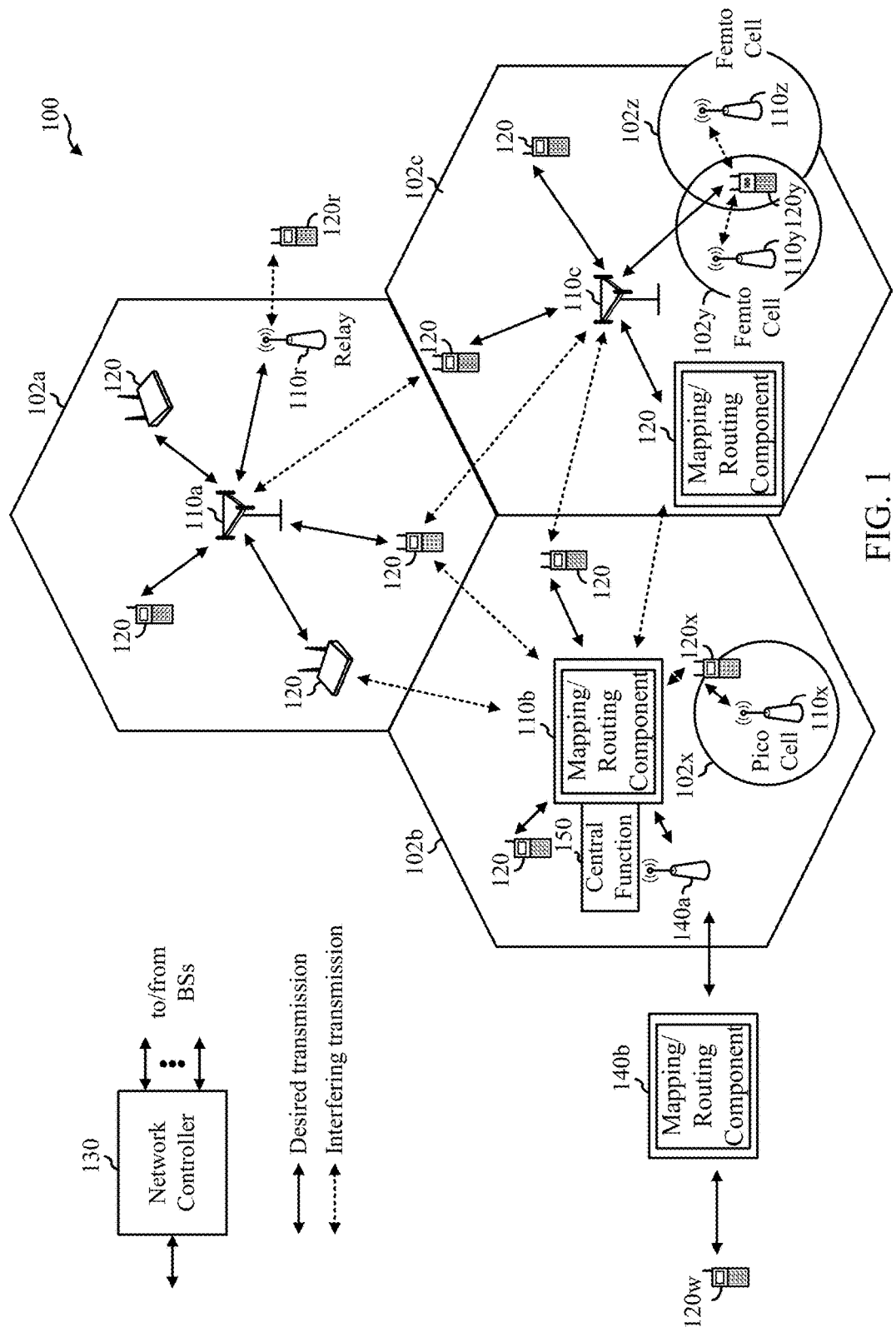
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to configuring and operating wireless devices (e.g., relays, CUs, DUs, gNBs, UEs, etc.) to route packets over a wireless path comprising one or more wireless devices between, for example, a UE and a CU or gNB. For example, in certain aspects, for a UL packet, a UE sends a packet to a first wireless device (e.g., DU, relay, gNB, UE, etc.). The wireless device based on a routing label (e.g., routing label identifier (RID)) and a mapping (e.g., routing table, forwarding information base (FIB), forwarding table, etc.) stored at the wireless device, determines a next hop to forward the packet. For example, the wireless device maps the routing label to at least one radio link (e.g., based on a cell radio network temporary identifier (C-RNTI)) and at least one bearer (e.g., based on a bearer ID or logical channel identifier (LCID)) of the radio link. The radio link and at least one bearer may be associated with or used to communicate with a destination wireless device (e.g., DU, CU, relay, gNB, UE, etc.). The at least one radio link may include one or more backhaul links and/or one or more access links. The wireless device transmits the packet on the determined at least one radio link and at least one bearer. The destination wireless device, listening on the at least one radio link and at least one bearer, receives the packet. The destination wireless device may either further forward the packet based on a routing label included in the packet (e.g., if the destination wireless device is a DU, relay, gNB, UE, etc.), or may process the packet (e.g., if the destination wireless device is the CU or the gNB). In certain aspects, similar procedures are used for a DL packet sent from a CU or gNB to a UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc. In certain aspects, a relay station may be a DU.

The wireless network 100 may also include wireless devices (e.g., wireless devices 140a and 140b) configured to perform multihop relay as discussed herein. For example, wireless devices 140a and 140b may be configured to route packets over a wireless path comprising one or more wireless devices including wireless devices 140a and 140b, UE 120w, and BS 110b based on routing labels included in the packets and mappings stored at the wireless devices 140a and 140b. The mappings may be configured by a central function (CF) 150. The CF 150 may be coupled to a BS 110 as shown with respect to BS 110b or integrated in the BS 110b. In certain aspects, one or more of a BS 110, UE 120, or wireless device 140 may include a mapping/routing component configured to store mappings and route packets according to the techniques discussed herein.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
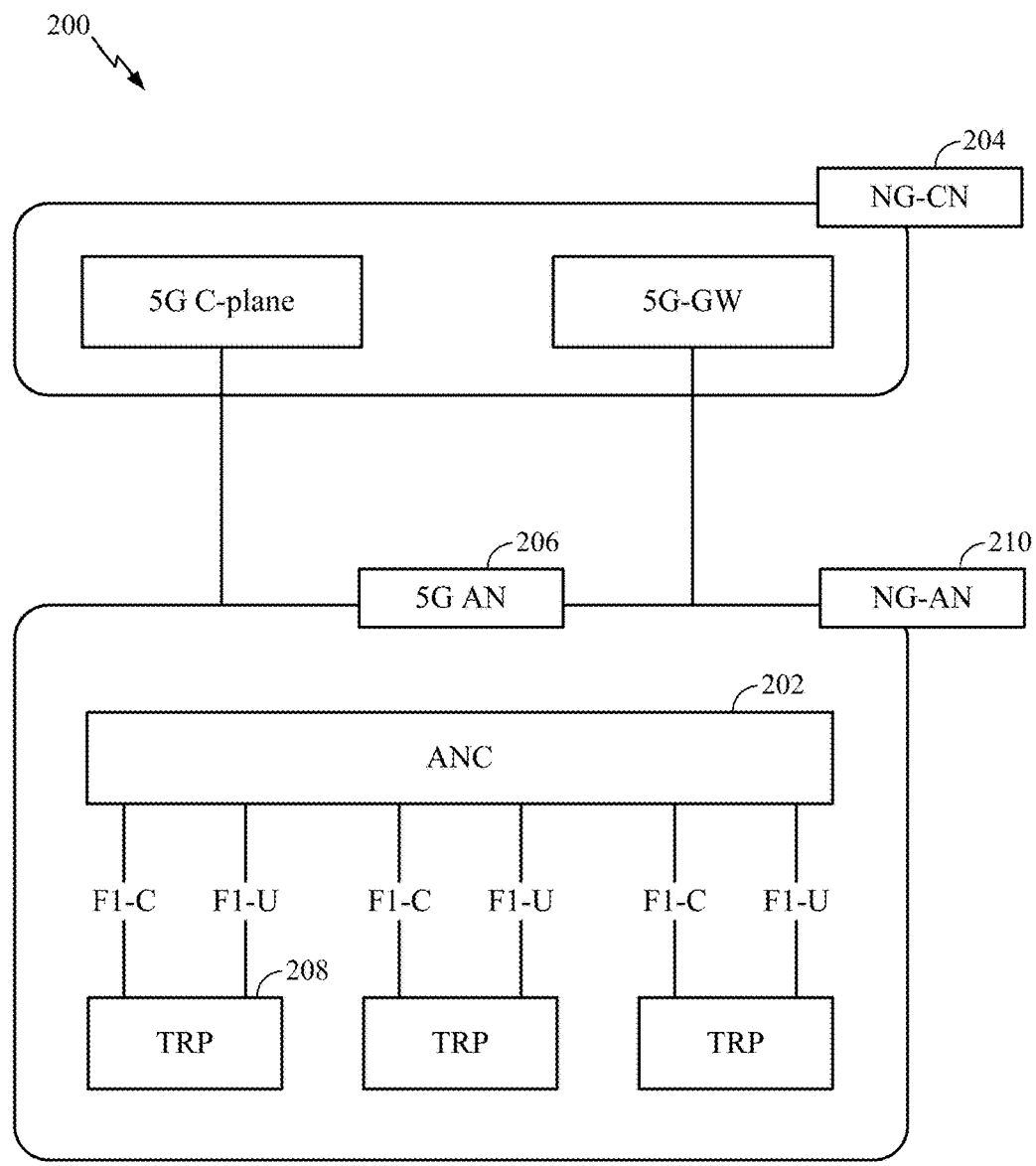
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS (e.g., gNB) may include a central unit (CU) (e.g., ANC 202) and/or one or more distributed units (e.g., one or more TRPs 208).

Figure 3:
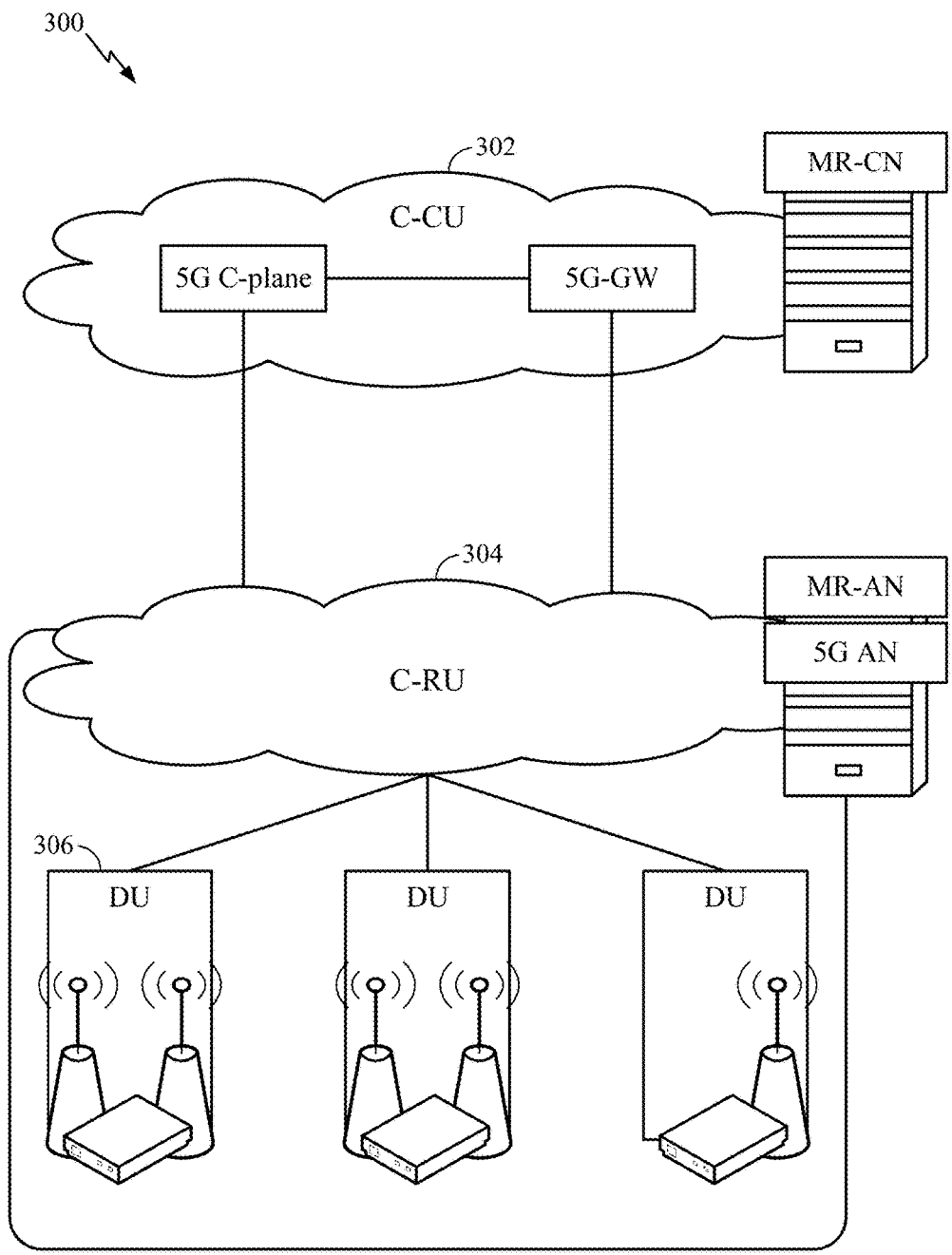
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
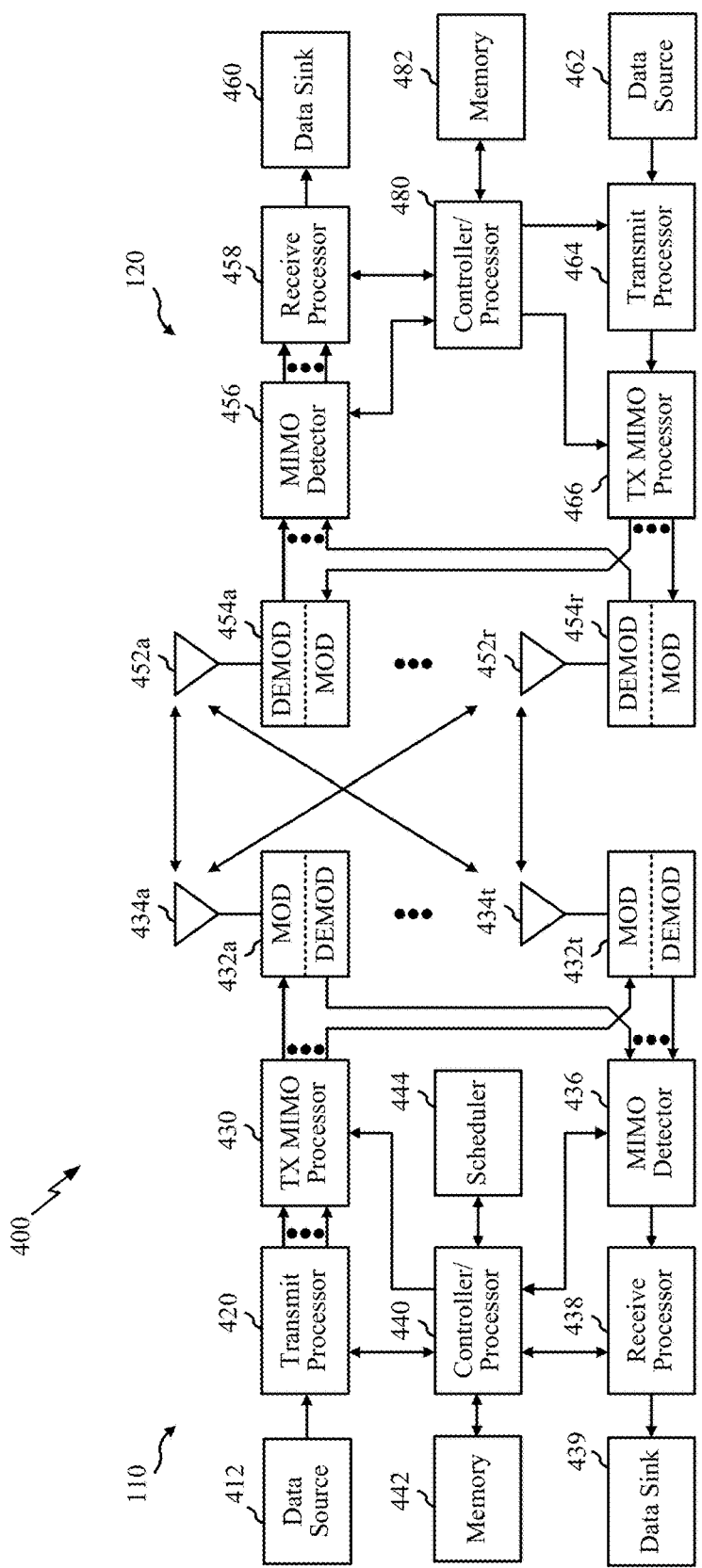
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
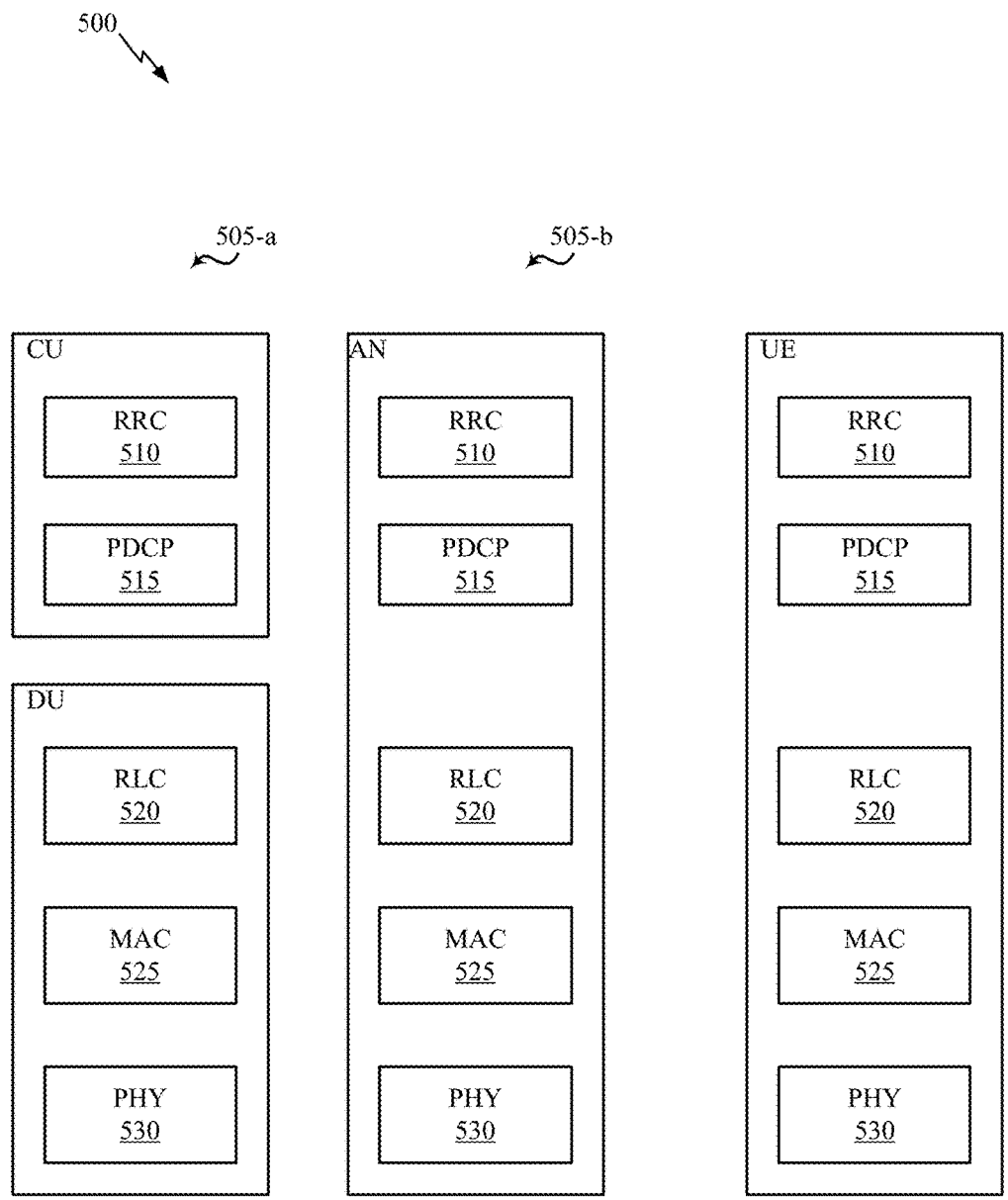
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
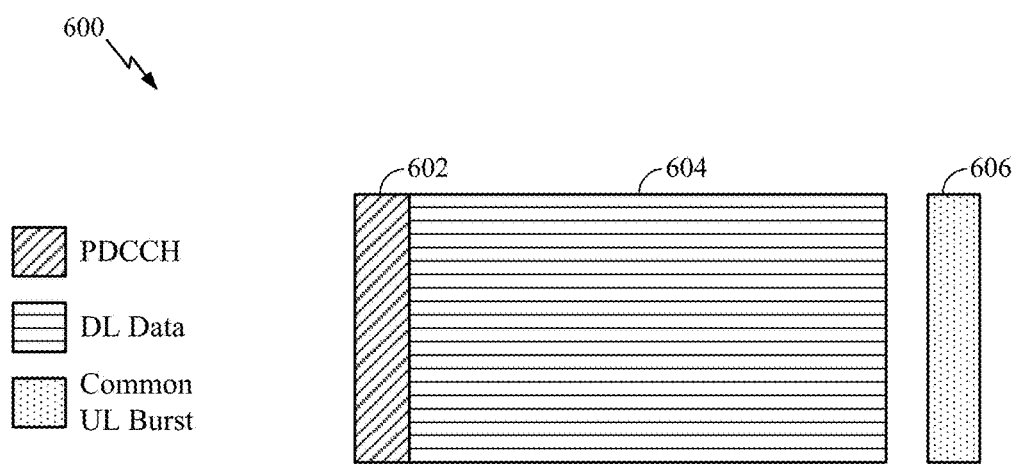
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
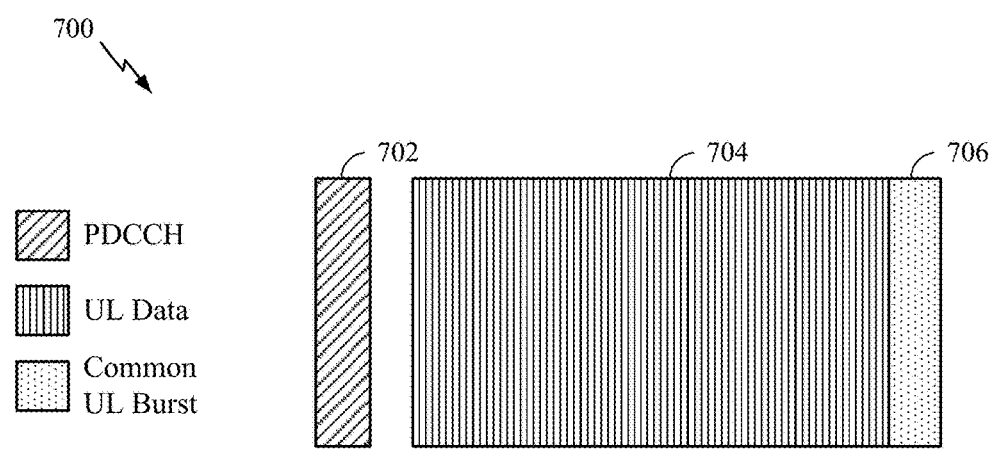
FIG. 7 illustrates an example of an UL-centric subframe, in accordance with certain aspects of the present disclosure.

FIG. 7 is a diagram 700 showing an example of an UL-centric subframe. The UL -centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Wireless Multihop Relay

In certain aspects, communication between a UE (e.g., UE 120) and an AN (e.g., AN 206) may be via an ANC (e.g., ANC 202, a CU) that is physically connected (e.g., via a wired interface) to one or more TRPs (e.g., TRPs 208, DUs). As discussed, the CU may communicate via a backhaul interface (e.g., a wired interface) with the core network (e.g., NG-CN 204). In order to provide coverage to the UE 120 across geographical areas, dense deployment of cells may be needed. For example, the UE 120 may utilize communication technologies with limited range (e.g., mmW with line-of-sight range). In certain aspects, it may not be feasible to connect every cell via a backhaul interface (e.g., a wired interface such as N2 (or S1-MME), N3 (or S1-U), etc.) such as due to physical restrictions and/or cost. Accordingly, in certain aspects, a relay station may be used to receive wireless transmissions including packets from the UE and further wirelessly transmit the packets to the CU (e.g., via a DU). In certain aspects, such a relay station is limited to a single hop, meaning there is only one wireless relay station between the UE and the CU, due to the manner in which the packets are handled. Such a limitation to a single hop for the relay station may still lead to a large number of cells that are connected via a wired backhaul interface. Accordingly, aspects of the present disclosure relate to configuring and operating wireless devices (e.g., relays, CUs, DUs, gNBs, UEs, etc.) to route packets in a manner that supports wireless multihop relay between a UE and a CU.

Figure 8:
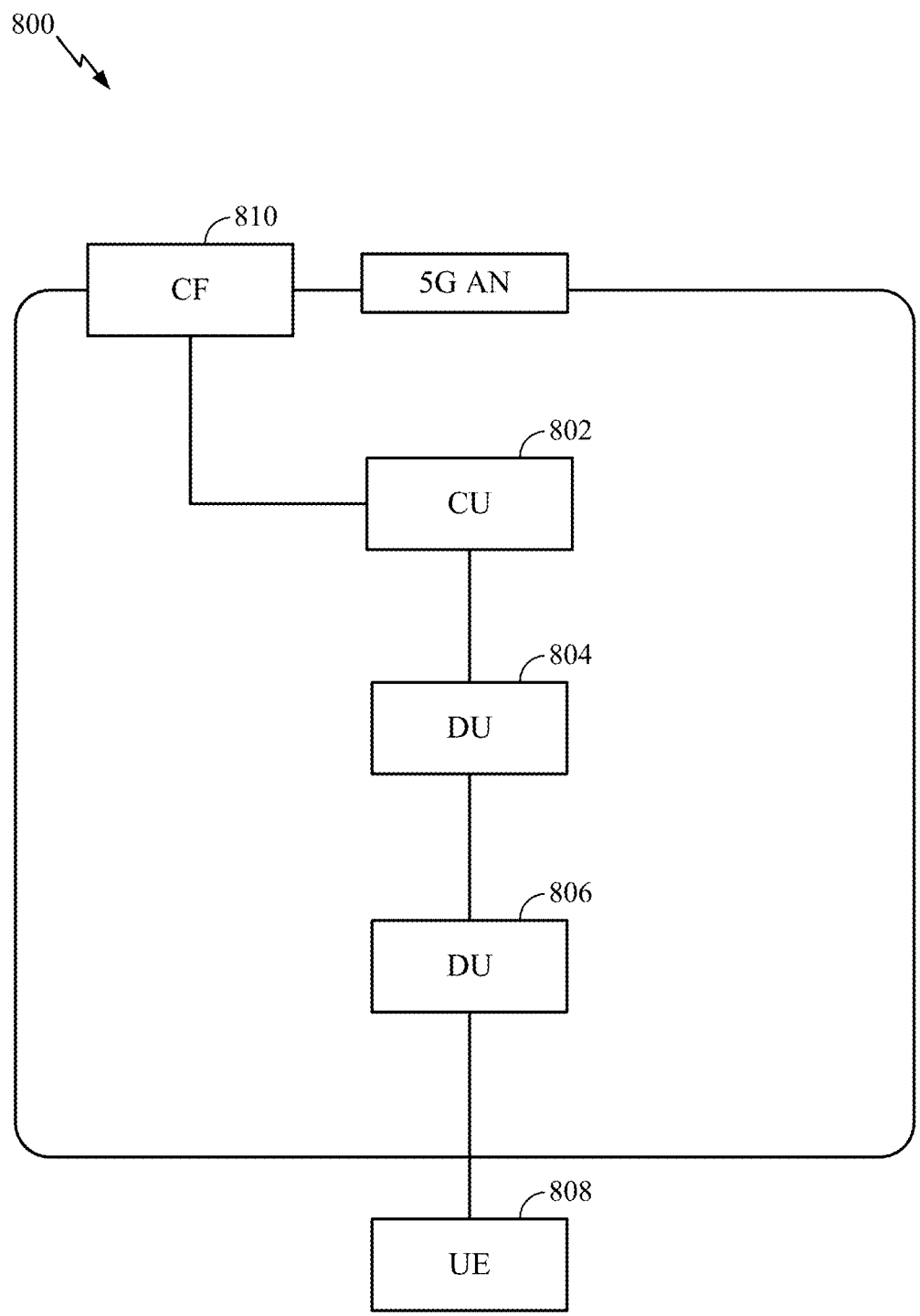
FIGS. 8-8B are block diagrams illustrating example physical architectures of distributed radio access networks (RANs) that supports wireless multihop relay, in accordance with certain aspects of the present disclosure.

FIG. 8 is a block diagram illustrating an example physical architecture of a distributed RAN 800 that supports wireless multihop relay, in accordance with certain aspects of the present disclosure. As shown, the RAN 800 includes a CU 802, a DU 804, a DU 806, and a CF 810. In certain aspects, the CU 802, DU 804, and DU 806 form an access node (e.g., 5G access node). In certain aspects, CU 802 is not connected by a wired interface to either of DU 804 or DU 806, and further DU 804 and DU 806 are not connected by a wired interface. Accordingly, in certain aspects, each of CU 802, DU 804, and DU 806 are configured to communicate via a wireless interface. Further, UE 808 may be configured to communicate via a wireless interface with one or more of DU 804, DU 806, and CU 802.

In certain aspects, each of DU 804 and DU 806 may be configured to act as wireless relays between CU 802 and UE 808. Accordingly, DU 804 and DU 806 may act as a wireless fronthaul for the CU 802. For example, DU 806 may be configured to receive packets (e.g., UL packets) from UE 808 and forward the packets wirelessly to DU 804, which forwards the packets wirelessly to CU 802. Further, DU 804 may be configured to receive packets (e.g., DL packets) from CU 802 and forward the packets wirelessly to DU 804, which forwards the packets wirelessly to CU 802. Though certain aspects are described with respect to DUs (e.g., DU 804 and DU 806) acting as wireless relays, it should be noted that other devices may instead be used to perform the functions described with respect to any one or all of the DUs acting as wireless relays. For example, instead of a DU, a UE, gNB, or other access node may perform the functions described with respect to the DU acting as a wireless relay. Further, though certain aspects are described with respect to CUs, it should be noted that other devices (e.g., gNBs) may instead be used to perform the functions described with respect to any one or all of the CUs.

Figure 8A:
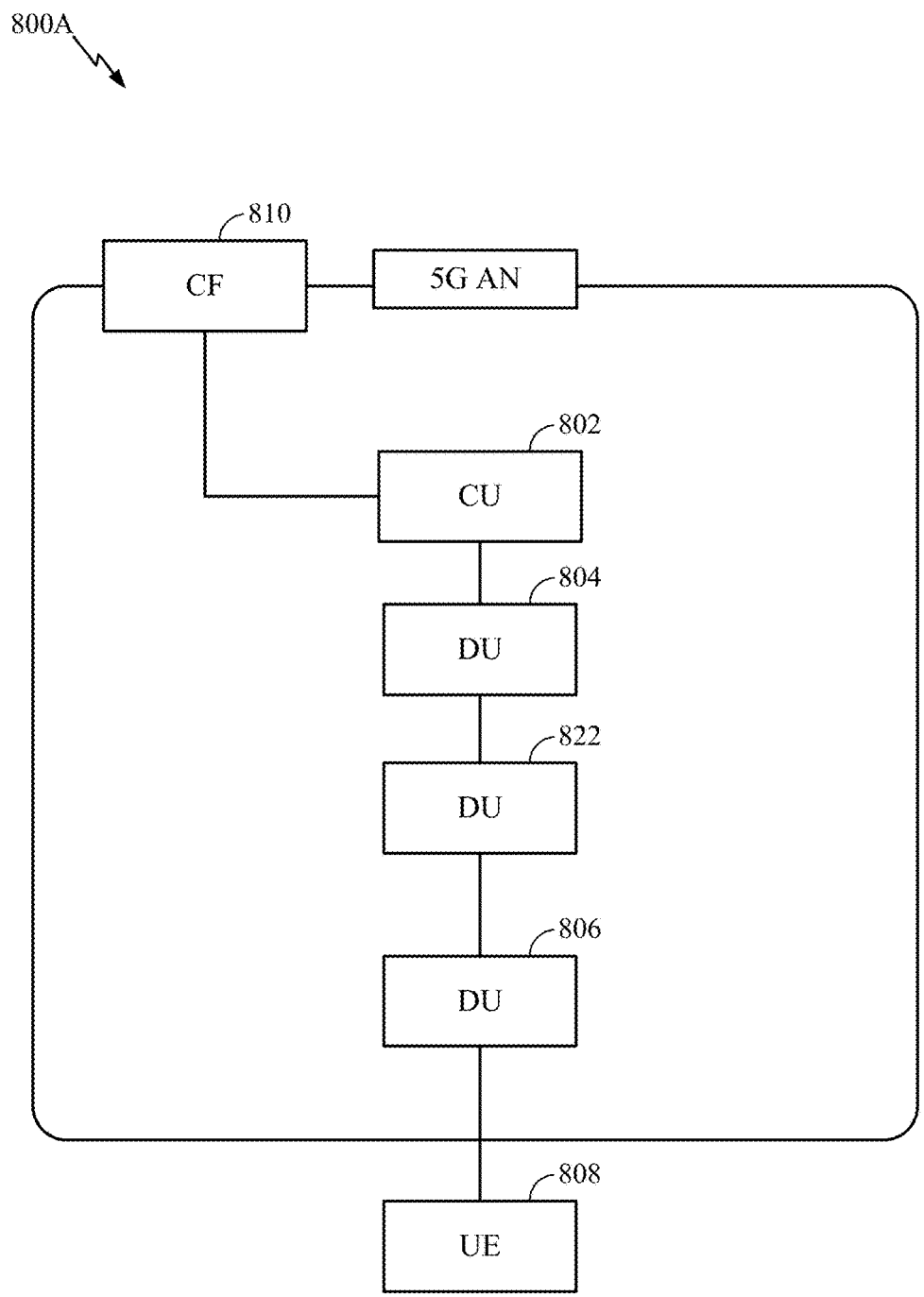

Further, though only two relays DU 804 and DU 806 are shown for simplicity in FIG. 8, there may be any number of relays in any suitable topology for wirelessly relaying packets between CU 802 and UE 808. For example, as shown in FIG. 8A, in RAN 800A, there may be additional relays, shown as DU 822, between CU 802 and UE 808. In RAN 800A, packets from UE 808 may pass from DU 806, to DU 822, to DU 804, to CU 802. Further, packets from CU 802 may pass from DU 804, to DU 822, to DU 806, to UE 808.

Figure 8B:
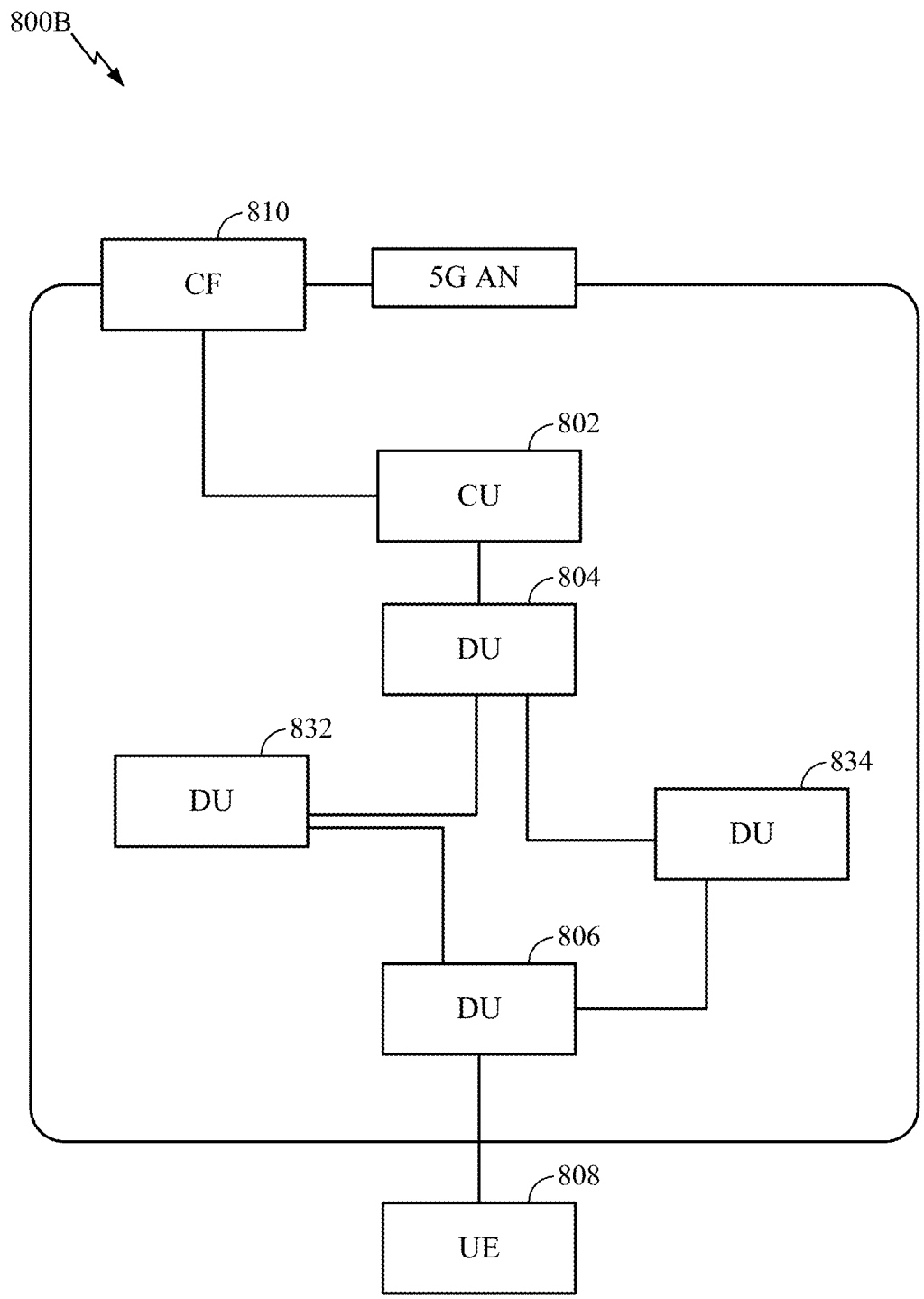

Further, as shown in FIG. 8B, there may be multiple paths among the relays between CU 802 and UE 808. For example, as shown in FIG. 8B, in RAN 800B, there may be additional relays, shown as DU 832 and DU 834, between CU 802 and UE 808. In RAN 800B, packets from UE 808 to CU 802 may pass from DU 806 to either DU 832 or DU 834. Further, the packet from either DU 832 or DU 834 is passed to DU 804, and then to CU 802. Further, packets from CU 802 to UE 808 may pass from DU 804 to either DU 832 or DU 834. Further, the packet from either DU 832 or DU 834 is passed to DU 806, and then to UE 808.

In certain aspects, the wireless links between each of the DUs, CUs, and/or UEs are defined by one or more radio links (e.g., as identified by one or more cell radio network temporary identifiers (C-RNTIs)) (e.g., including one or more backhaul links one or more access links, or a combination of one or more backhaul links and one or more access links), and one or more radio bearers (e.g., as identified by one or more bearer identifiers or one or more logical channel identifiers (LCIDs)) corresponding to the one or more radio links. For example, each radio link may have one or more radio bearers. There may be one or more radio links between each set of devices (e.g., DU 804 and DU 806 of RAN 800). Further, on each of the one or more radio links between each set of devices, one or more radio bearers may be used for communication between each set of devices. In certain aspects, each device is configured to listen on one or more radio links, and one or more radio bearers of the one or more radio links associated with the device, corresponding to each connection between the device and other wireless devices. Accordingly, a transmitting device (e.g., DU 804) can send data to a receiving device (e.g., DU 806) by identifying the one or more radio links and one or more radio bearers associated with the receiving device and utilized for a connection between the transmitting device and the receiving device, and transmitting the data on the one or more radio links and one or more radio bearers.

In certain aspects, as discussed with respect to FIG. 5, logical functions may be split between DUs and CUs. For example, in certain aspects, as discussed with first option 505-a, a CU (e.g., CU 802, etc.) is configured to implement the RRC layer and the PDCP layer, while the DUs (e.g., DU 804, 806, 822, 832, 834, etc.) are configured to implement the RLC layer, MAC layer, and PHY layer. By splitting such logical functionality, the processing at each of the DUs acting as wireless relays is reduced, thereby reducing the delay in relaying the packets between multiple devices. In certain aspects, each of the DUs may optionally implement the PDCP layer as well, such as for security between hops between the DUs.

In certain aspects, in order to ensure that the wireless devices (e.g., UEs, DUs, CUs, gNBs, etc.) wirelessly route packets correctly in a RAN (e.g., RAN 800, 800A, or 800B) that supports wireless multihop in accordance with the aspects discussed herein, each of the wireless devices may be configured with a mapping (e.g., routing table, forwarding information base (FIB), forwarding table, etc.) that the wireless device utilizes to determine a next hop to transmit/forward the packets wirelessly. The mapping and use of the mapping is described in further detail herein. In addition, in certain aspects, the mapping or portions of the mapping are configured at each of the wireless devices by one or more central functions (CFs), such as CF 810. For example, in certain aspects, the CF is configured to transmit information indicative of the mapping to each of the associated wireless devices (e.g., directly or indirectly, via a wired interface and/or a wireless interface). The functionality of a CF is described in further detail herein.

In certain aspects, a CF (e.g., CF 810) may be implemented or collocated in a CU (e.g., CU 802). In certain aspects, a CF may be connected to a CU (e.g., by a wired or wireless interface). In certain aspects, a single CF may be connected to a plurality of CUs and perform configuration for the plurality of CUs, and the plurality of devices (e.g., DUs, gNBs, UEs, etc.) that communicate with the plurality of CUs. In certain aspects, for wireless devices to receive the mapping information from the CF 810, the wireless devices establish an association (e.g., a direct or indirect (e.g., via one or more relays) connection) with a network node (e.g., CU, gNB, etc.) in communication with or implementing the CF 810.

In certain aspects, in order to route packets, the wireless devices (e.g., CUs, DUs, UEs, or gNBs) may implement a routing protocol layer (e.g., a shim layer (R-SHIM)). In certain aspects, the routing protocol layer may be implemented between the PDCP layer and the RLC layer, or above the RLC layer. In certain aspects, instead of implementing a separate routing protocol layer, the routing protocol layer functionality may be implemented as part of the PDCP layer.

Accordingly, in certain aspects, the routing protocol layer is a simple layer only used to route packets to the next hop. For example, in certain aspects, the routing protocol layer may be configured to add to a packet/utilize in a packet/remove from a packet a header (e.g., shim header) including a routing label (e.g., routing label identifier (RID)). In certain aspects, the routing label, in conjunction with the mapping, is utilized by the routing protocol layer to determine a next hop destination to forward the packet. In certain aspects, the header may additionally include an identifier of a UE (e.g., UID) associated (e.g., as source or destination device) with the packet. In certain aspects, the header may additionally include an identifier of a quality of service (QoS) requirement for the packet.

In certain aspects, the routing protocol layer is not implemented at the UE communicating with the CU, and instead is only implemented by the CU and wireless relay DUs. In certain such aspects, for UL packets from the UE to the CU, the first DU to receive the packet wirelessly from the UE adds the routing label to the header. Further, in certain such aspects, for DL packets from the CU to the UE, the last DU that sends the packet wirelessly to the UE, removes the routing label from the header. Accordingly, the routing label may not be visible or utilized by the UE.

In certain aspects, the routing protocol layer is implemented at the UE communicating with the CU. In certain such aspects, the UE can select a path from multiple paths for routing packets, as described further herein, by selecting an appropriate routing label for the packet to be forwarded along the path.

FIG. 9 illustrates an example of mappings 900 utilized by wireless devices to determine a next hop destination to forward a packet. For example, mappings 904, 922, and 906 may refer to the mappings stored at DUs, 804, 822, and 806, respectively, of RAN 800A. In certain aspects, LCID1 of C-RNTI1 corresponds to an identifier of a radio bearer of a radio link associated with DU 804; LCID2 of C-RNTI2 corresponds to an identifier of a radio bearer of a radio link associated with DU 822; LCID3 of C-RNTI3 corresponds to an identifier of a radio bearer of a radio link associated with DU 806; and LCIDC of C-RNTIC corresponds to an identifier of a radio bearer of a radio link associated with CU 802.

In certain aspects, for a UL packet, DU 806 receives a packet wirelessly from UE 808. As discussed, the UE 808 may include in the packet a header with a routing label (e.g., R3) that is associated with CU 802 or not include a header with a routing label. If no routing label is included in the packet received at the DU 806, DU 806 adds a routing label (e.g., R3) that is associated with CU 802 to the packet. Further, DU 806 utilizes mapping 906 stored at DU 806 to determine a next hop to forward the packet based on the routing label included in the header of the packet. In certain aspects, the DU 806 further utilizes the link direction (e.g., UL or DL) of the packet to determine the next hop. For example, if the packet includes the routing label R3, and the packet is a UL packet, the DU 806 maps the routing label R3 to LCID2 of C-RNTI2 associated with DU 822 based on mapping 906. Accordingly, the DU 806 wirelessly transmits the packet with the routing label R3 on LCID2 of C-RNTI2.

In certain aspects, the mappings 906, 922, and 904 optionally (as shown) includes a cell identifier (cell ID) for each entry in the mappings 906, 922, and 904, as well. For example, a DU may be associated with multiple other devices (e.g., CUs, gNBs, etc.) and in multiple different cells (e.g., over different frequencies). These devices may be differentiated by utilizing different cell IDs for communication within the cell. Further, packets may include the cell ID (e.g., as inserted by a UE, CU, gNB, etc.) associated with the cell in which the packet is communicated. Accordingly, the cell ID in a packet may be used to route the packet within the correct cell to the correct device (e.g., CU, gNB, etc.). For example, certain aspects, the DU 806 further utilizes the link direction (e.g., UL or DL) of the packet to determine the next hop. For example, if the packet includes the routing label R3, and the packet is a UL packet, and the cell ID is 1, the DU 806 maps the routing label R3 to LCID2 of C-RNTI2 associated with DU 822 based on mapping 906. Such a cell ID may further be configured in mapping 906 by a CF, according to the techniques discussed herein.

DU 822 receives the packet from DU 806 on LCID2 of C-RNTI2. DU 822 maps the routing label R3 and UL direction for the packet to LCID1 of C-RNTI1 associated with DU 804 based on mapping 922. Accordingly, the DU 822 wirelessly transmits the packet with the routing label R3 on LCID1 of C-RNTI1. DU 804 receives the packet from DU 822 on LCID1 of C-RNTI1. DU 804 maps the routing label R3 and UL direction for the packet to LCIDC of C-RNTIC associated with CU 802 based on mapping 904. Accordingly, the DU 804 wirelessly transmits the packet with the routing label R3 on LCIDC of C-RNTIC. CU 802 receives the packet from DU 804 on LCID1 of C-RNTI1 and processes the packet.

In certain aspects, for a DL packet, DU 804 receives a packet wirelessly from CU 802. As discussed, the CU 802 may include in the packet a header with a routing label (e.g., R3) that is associated with UE 808. Further, DU 804 utilizes mapping 804 stored at DU 804 to determine a next hop to forward the packet based on the routing label included in the header of the packet. In certain aspects, the DU 804 further utilizes the link direction (e.g., UL or DL) of the packet to determine the next hop. For example, if the packet includes the routing label R3, and the packet is a DL packet, the DU 804 maps the routing label R3 to LCID2 of C-RNTI2 associated with DU 822 based on mapping 904. Accordingly, the DU 804 wirelessly transmits the packet with the routing label R3 on LCID2 of C-RNTI2.

DU 822 receives the packet from DU 804 on LCID2 of C-RNTI2. DU 822 maps the routing label R3 and DL direction for the packet to LCID3 of C-RNTI3 associated with DU 806 based on mapping 922. Accordingly, the DU 822 wirelessly transmits the packet with the routing label R3 on LCID3 of C-RNTI3. DU 806 receives the packet from DU 822 on LCID3 of C-RNTI3. DU 806, as the last hop before UE 808, transmits the packet to UE 808. As discussed, in certain aspects, DU 806 removes the routing label R3 from the packet prior to transmission to the UE 808.

In certain aspects, mappings 900 correspond to a per-path routing of packets between DUs. In particular, each routing label corresponds to a single wireless path between the UE 808 and CU 802. For example, for label R3, the single wireless path is ordered between DU 804, DU 822, and DU 806. In certain such per-path routing configurations, the DUs may be configured to not modify the routing labels between hops.

In certain aspects, there may be multiple paths between the UE 808 and CU 802. Accordingly, the CU 802 for the DL, or the UE 808 or DU 804 for the UL, may select a routing label to include in a header of a packet to select one of the multiple paths for the packet to be routed along. The CU 802, UE 808, or DU 804 may, for example, select the path based on at least one of a load balancing procedure, a link quality between devices (e.g., DUs, CUs, UEs, etc.), or a traffic type associated with the packet.

In certain aspects, there may be multiple radio links and/or multiple radio bearers between devices (e.g., DUs, CUs, UEs, etc.). Accordingly, the mapping entry may have multiple radio links and/or multiple radio bearers in the entry for a routing label. In certain aspects, a device is configured to transmit/forward a packet on each of the multiple radio links and/or multiple radio bearers identified in the mapping. In certain aspects, a device is configured to transmit/forward a packet on one or more of the multiple radio links and/or multiple radio bearers identified in the mapping. For example, the device may be configured to select one or more of the multiple radio links and/or multiple radio bearers identified in the mapping to transmit/forward the packet based on a quality of service (QoS) associated with the packet. In certain aspects, if the QoS of the packet is lower, fewer (e.g., one) of the multiple radio links and/or multiple radio bearers identified in the mapping may be selected. In certain aspects, if the QoS of the packet is higher, more (e.g., two) of the multiple radio links and/or multiple radio bearers identified in the mapping may be selected.

In certain aspects, the mappings may not include a radio bearer. For example, the CF 810 may not send information indicative of a mapping of RIDs to radio bearers, and instead only send information indicative of a mapping of RIDs to one or more radio links to the DUs. In such aspects, packets exchanged between the wireless devices may include one or more identifiers of QoS requirements in the header of the packet. The DUs may then select a radio bearer to transmit the packet autonomously. For example, the DU may map the RID to one or more radio links, and then select one or more radio bearers of the one or more radio links to transmit the packet based on the one or more radio bearers satisfying the QoS requirements identified by the one or more identifiers of QoS requirements. In certain aspects, the CF 810 may send information indicative of a mapping of radio bearers to one or more identifiers of quality service requirements to each of the wireless devices, which the wireless devices may utilize to select the one or more radio bearers.

In certain aspects, when a new DU is added to the fronthaul of the CU 802, or a path (e.g., between DUs) in the fronthaul of the CU 802 is updated, the mappings at each of the DUs of the fronthaul may be configured or updated by the CF 810. For example, if the fonthaul at first includes DU 822 and DU 804, but not DU 806, the mappings 922 and 904 at DU 822 and DU 804, respectively, may be different than shown in FIG. 9. For example, mappings 922 and 904 may not include any of the entries with the routing label R3 as shown. When DU 806 is added to the fronthaul, CF 810 may configure DU 806 with mapping 906, and further update mappings 922 and 904 to include the entries with the routing label R3 as shown.

Figure 10:
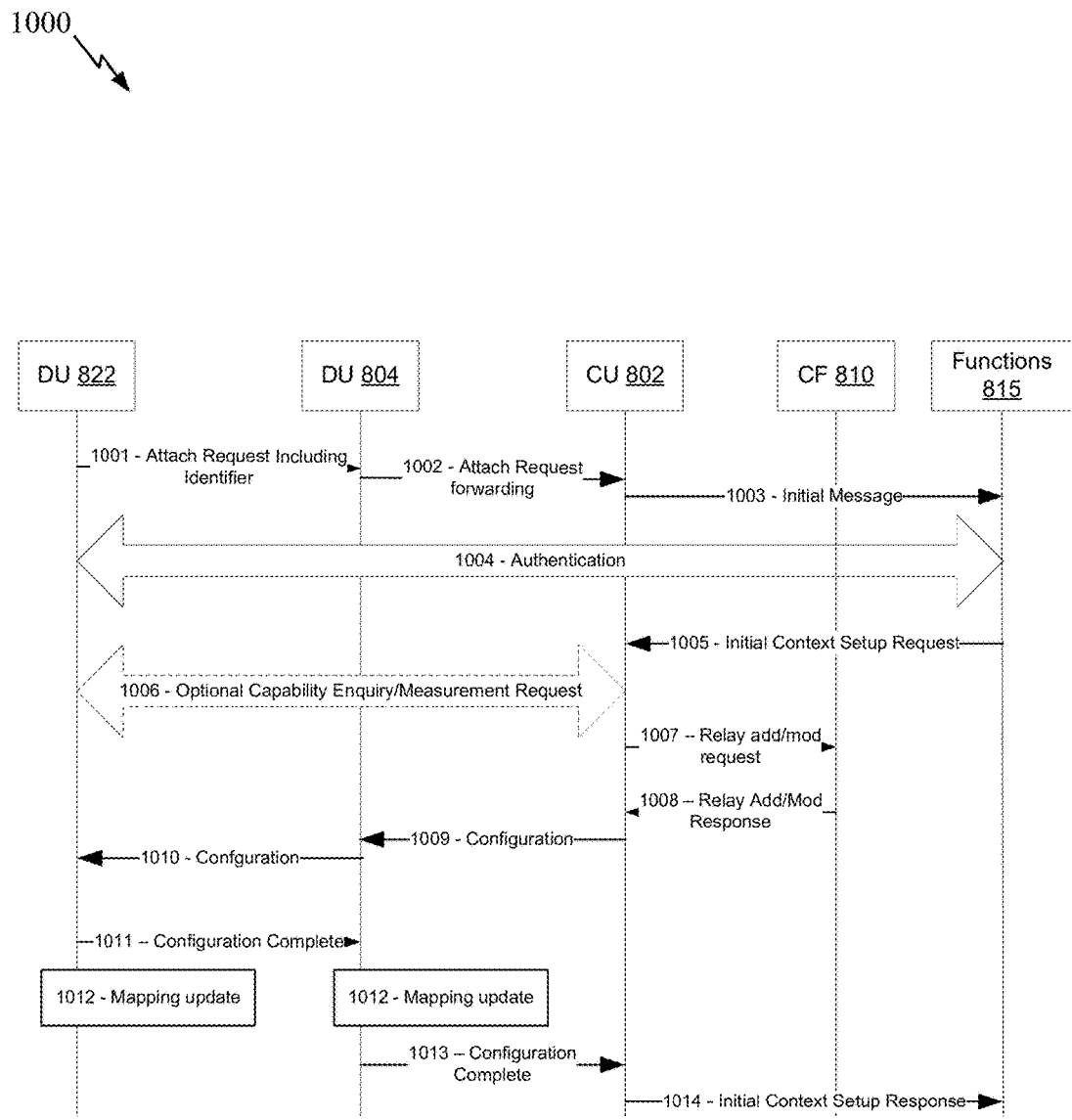
FIG. 10 is a flow diagram illustrating signaling between wireless devices for adding a wireless relay device to a fronthaul, in accordance with certain aspects of the present disclosure.

FIG. 10 is a flow diagram illustrating signaling between wireless devices for adding a wireless relay device to a fronthaul, in accordance with certain aspects of the present disclosure.

As shown, FIG. 10 shows the signaling between DU 822, DU 804, CU 802, CF 810, and functions 815 (e.g., authentication functions (e.g., AMF/SEAF and/or AUSF/ARPF)) (e.g., performed by elements of the core network, CU 802, etc.) to add DU 822 to the fronthaul of CU 802. At 1001, DU 822 sends (e.g., using RRC) to DU 804 an attach request message including an identifier of the DU 822 indicating the DU 822 is to act as a wireless relay. At 1002, DU 804 forwards the attach request message to the CU 802. In certain aspects, the DU 804 further includes in the attach request message an identifier of the DU 804. At 1004, the CU 802 sends an initial message (e.g., an initial message sent by a UE to DU 822 to forward to CU 802) for the DU 822 to the functions 815 for connecting to the fronthaul. At 1004, the functions 815 authenticate the DU 822.

At 1005, the functions 815 send to the CU 802 an initial context setup request for the CU 802 to configure the DU 822 (e.g., based on the RRC method). For example, at 1006, the CU 802 optionally sends a capability enquiry and/or measurement report request (e.g., based on the RRC method) to the DU 822 for the DU 822 to provide its capabilities, a list (e.g., including link measurements (e.g., channel quality indicator (CQI), signal to noise ratio (SNR), etc.)) of neighboring wireless devices (e.g., DUs), and/or a report of quality (e.g., load information, RF measurements, service requirements for the link, QoS for the link, etc.) of one or more radio links (e.g., as identified by the CU 802). For example, in order to configure the wireless path(s) between DU 822 and CU 802, the CF 810 may utilize information about the neighboring wireless devices of DU 822 and/or radio links measured by the DU 822. The DU 822 may further send the capabilities, list of neighboring wireless devices, and/or report of quality of one or more radio links to the CU 802 in response to the enquiry and/or request. For example, DU 822 may listen on frequency bands and/or radio links (e.g., defined in the measurement report request) for neighboring wireless devices.

At 1007, the CU 802 sends to CF 810 a relay addition or modification request for adding the DU 822 to the fronthaul of CU 802. In certain aspects, the relay addition or modification request includes the capabilities, list of neighboring wireless devices, and/or report of quality of one or more radio links of the DU 822. In certain aspects, the relay addition or modification request includes an identifier of the UE (e.g. UID) that the DU 822 is sending path modification information for.

The CF 810, based on receiving the relay addition or modification request for adding the DU 822 to the fronthaul of CU 802, determines wireless path(s) between the DU 822 and CU 802. Further, in certain aspects, the CF 810 generates routing label(s) corresponding to the determined wireless path(s). The CF 810 further generates mapping(s) (e.g., new mappings, updates to mappings, etc.) for each of the devices of the fronthaul, as discussed herein, based on the determined wireless path(s). For example, in certain aspects, the CF 810 may determine at least one radio link and at least one radio bearer for the DU 822 to communicate in the fronthaul. In certain aspects, the CF 810 determines the at least one radio link and at least one radio bearer based on the capabilities, list of neighboring wireless devices, and/or report of quality of one or more radio links of the DU 822. For example, the CF 810 may select radio links and/or radio bearers for communication that have better link quality, measurement statistics, and/or that meet QoS requirements. In certain aspects, the CF 810 determines at least one radio link for the DU 822 to communicate in the fronthaul, but does not specify which radio bearer DU 822 should use. In certain such aspects, DU 822 may itself determine at least one radio bearer of the at least one radio link specified by the CF 810 to use, such as based on QoS requirements or service requirements for forwarding packets as discussed.

At 1008, the CF 810 sends to CU 802 a relay addition or modification response for adding the DU 822 to the fronthaul of CU 802. The relay addition or modification response may include information indicative of the mappings.

At 1009, the CU 802 sends to DU 804 a configuration message to configure DU 804. The configuration message may include information indicative of the mappings for DU 804 and DU 822. In certain aspects, the configuration message is a RRC connection reconfiguration message. At 1010, the DU 804 sends the configuration message to the DU 822 to configure the DU 822. At 1011, DU 822 sends a configuration complete message to the DU 804 indicating that the configuration of the mappings is received by the DU 822. At 1012, the DU 804 and DU 822 configure the mappings as discussed based on the received information indicative of the mappings for DU 804 and DU 822, respectively. At 1013, DU 804 sends a configuration complete message to the CU 802 indicating that the configuration of the mappings is received by the DU 804. At 1014, the CU 802 sends to the functions 815 an initial context setup response message that the setup of DU 822 as a wireless relay is complete.

In certain aspects, mappings may be updated at the wireless devices by CF 810 at other times than when a device is added to the fronthaul of a CU. For example, DUs may at times (e.g., periodically, due to a link failure of a wireless relay, etc.) exchange measurement report requests and/or measurement reports with the CF 810. The wireless devices may accordingly perform 1006-1013 to update the mappings accordingly. For example, new wireless relays may be discovered (e.g., using an autonomous discovery mechanism, such as LTE-D, where the resources allocated for discovery are centrally configured) and added, new wireless paths may be configured, wireless paths may be modified, wireless relays may be removed due to poor link quality, etc.

Figure 11:
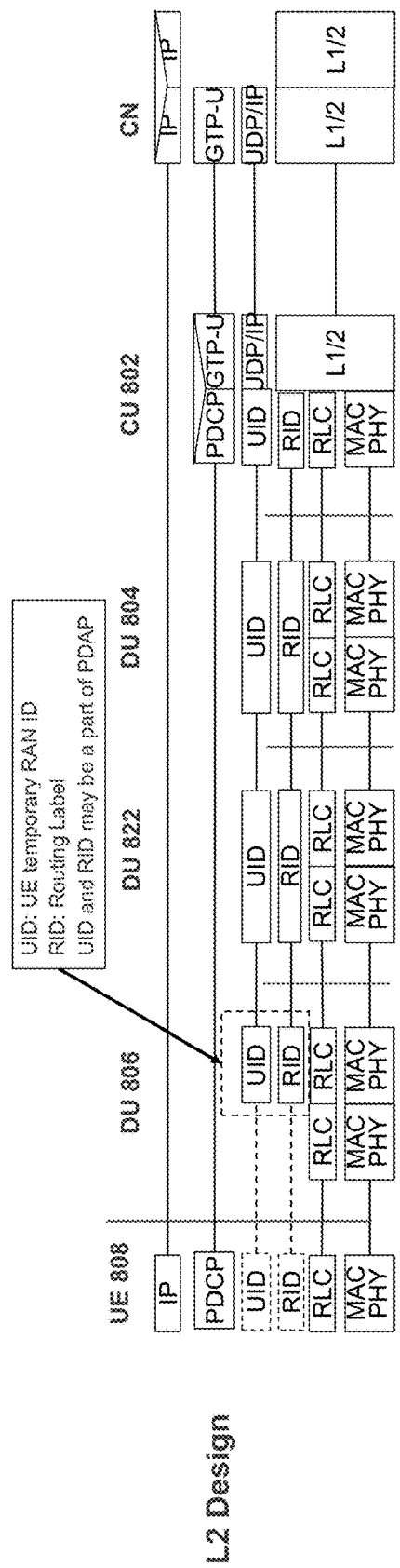
FIG. 11 illustrates an example of the protocol stacks implemented by the devices of the RAN of FIG. 8A for routing packets, in accordance with certain aspects of the present disclosure.

FIG. 11 illustrates an example of the protocol stacks implemented by the devices of RAN 800A for routing packets, in accordance with certain aspects of the present disclosure. As shown, the UID layer and RID layer may be portions of the routing protocol layer described herein. In particular, the UID layer may be configured to add/modify/delete/utilize an identifier (e.g., a UE temporary RAN ID (UID)) of a source or destination UE of a packet. The RID layer may be configured to add/modify/delete/utilize an identifier (e.g., a RID) of a routing label of a packet.

In certain aspects, the UE 808 implements the UID and RID layers, such as where the UE 808 is configured to implement a routing layer as discussed. In certain aspects, the UE 808 does not implement the UID and RID layers as discussed. Each of the DU 806, DU 822, and DU 804 are configured to implement the UID and RID layers, as discussed. Further, where UE 808 does not implement the routing layer, DU 806 may be configured to add/remove the UID and RID from packets exchanged with the UE 808 as discussed. In certain aspects, such as where per-path routing of packets is used as discussed, the UID is not bound to the RID, and therefore DU 806 can select a routing label independent of the UID to select a path for packets from the UE 808.

In certain aspects, instead of a per-path routing of packets between DUs, where each routing label corresponds to a particular path, a hop-by-hop routing of packets between DUs is used. In such hop-by-hop routing of packets, in certain aspects, each label corresponds to a single hop from a source device to a destination device, as further described herein.

FIG. 12 illustrates an example of mappings 1200 utilized by wireless devices to determine a next hop destination to forward a packet in a hop-by-hop routing scheme, in accordance with certain aspects of the present disclosure. For example, mappings 1204, 1222, and 1206 may refer to the mappings stored at DUs, 804, 822, and 806, respectively, of RAN 800A. In certain aspects, LCID1 of C-RNTI1 corresponds to an identifier of a radio bearer of a radio link associated with DU 804; LCID2 of C-RNTI2 corresponds to an identifier of a radio bearer of a radio link associated with DU 822; LCID3 of C-RNTI3 corresponds to an identifier of a radio bearer of a radio link associated with DU 806; and LCIDC of C-RNTIC corresponds to an identifier of a radio bearer of a radio link associated with CU 802.

In certain aspects, for a UL packet, DU 806 receives a packet wirelessly from UE 808. As discussed, the UE 808 may include in the packet a header with a routing label (e.g., R3 ) that is associated with CU 802 or not include a header with a routing label. If no routing label is included in the packet received at the DU 806, DU 806 adds a routing label (e.g., R3 ) that is associated with CU 802 to the packet. Further, DU 806 utilizes mapping 1206 stored at DU 806 to determine a next hop to forward the packet based on the routing label included in the header of the packet. In certain aspects, the DU 806 further utilizes the link direction (e.g., UL or DL) of the packet to determine the next hop. For example, if the packet includes the routing label R32, and the packet is a UL packet, the DU 806 maps the routing label R3 to LCID2 of C-RNTI2 associated with DU 822 based on mapping 1206. Accordingly, the DU 806 wirelessly transmits the packet with the routing label R3 on LCID2 of C-RNTI2.

In certain aspects, the mappings 1206, 1222, and 1204 optionally (as shown) includes a cell identifier (cell ID) for each entry in the mappings 1206, 1222, and 1204, similar to as discussed with respect to mappings 906, 922, and 904. For example, if the packet includes the routing label R3, and the packet is a UL packet, and the cell ID is 1, the DU 806 maps the routing label R3 to LCID2 of C-RNTI2 associated with DU 822 based on mapping 1206.

DU 822 receives the packet from DU 806 on LCID2 of C-RNTI2. DU 822 maps the routing label R3 and UL direction for the packet to LCID1 of C-RNTI1 associated with DU 804 based on mapping 1222. Further, since hop-by-hop routing of packets is used, the routing label is only valid for one hop. Accordingly, routing label R32 is not valid to be sent to DU 804. Accordingly, DU 822 further maps the routing label R32 to another routing label R21 based on mapping 1222. DU 822 further replaces the routing label R32 in the packet with routing label R21. Accordingly, the DU 822 wirelessly transmits the packet with the routing label R21 on LCID1 of C-RNTI1.

DU 804 receives the packet from DU 822 on LCID1 of C-RNTI1. DU 804 maps the routing label R21 and UL direction for the packet to LCIDC of C-RNTIC associated with CU 802 based on mapping 1204. DU 804 further maps the routing label R21 to another routing label R10 based on mapping 1204. DU 804 further replaces the routing label R21 in the packet with routing label R10. Accordingly, the DU 804 wirelessly transmits the packet with the routing label R10 on LCIDC of C-RNTIC. CU 802 receives the packet from DU 804 on LCID1 of C-RNTI1 and processes the packet.

In certain aspects, for a DL packet, DU 804 receives a packet wirelessly from CU 802. As discussed, the CU 802 may include in the packet a header with a routing label (e.g., R10') that is associated with UE 808. Further, DU 804 utilizes mapping 804 stored at DU 804 to determine a next hop to forward the packet based on the routing label included in the header of the packet. In certain aspects, the DU 804 further utilizes the link direction (e.g., UL or DL) of the packet to determine the next hop. For example, if the packet includes the routing label R10', and the packet is a DL packet, the DU 804 maps the routing label R10' to LCID2 of C-RNTI2 associated with DU 822 based on mapping 1204. DU 804 further maps the routing label R10' to another routing label R21' based on mapping 1204. DU 804 further replaces the routing label R10' in the packet with routing label R21'. Accordingly, the DU 804 wirelessly transmits the packet with the routing label R21' on LCID2 of C-RNTI2.

DU 822 receives the packet from DU 804 on LCID2 of C-RNTI2. DU 822 maps the routing label R21' and DL direction for the packet to LCID3 of C-RNTI3 associated with DU 806 based on mapping 1222. DU 822 further maps the routing label R21' to another routing label R32 based on mapping 1222. DU 822 further replaces the routing label R21' in the packet with routing label R32. Accordingly, the DU 822 wirelessly transmits the packet with the routing label R32 on LCID3 of C-RNTI3. DU 806 receives the packet from DU 822 on LCID3 of C-RNTI3. DU 806, as the last hop before UE 808, transmits the packet to UE 808. As discussed, in certain aspects, DU 806 removes the routing label R32 from the packet prior to transmission to the UE 808.

In certain aspects, the amount of information for updating mappings at the DUs by CF 810 may be reduced when using hop-by-hop routing as opposed to per-path routing. For example, hop-by-hop routing may use similar procedures for adding a wireless relay/updating mappings as described with respect to FIG. 10. However, when a new DU is added to the fronthaul, instead of all the mappings of all of the DUs in the fronthaul being updated, only the new DU and the immediate neighbor(s) of the new DU need to be updated. Further, in certain aspects with hop-by-hop routing, since routing labels are only relevant locally, routing labels can be reused for different hops.

In certain aspects, instead of a per-path routing or hop-by-hop routing of packets between DUs, a per-UE routing of packets between DUs is used. In such per-UE routing of packets, in certain aspects, in addition to the routing label corresponding to a particular path, a UID may be used to assign different routing labels to different UEs, so that different UEs connected to the same relay, may have packets sent on different paths (e.g., for path diversity, load balancing, packet prioritization, etc.). The assignment of UIDs to routing labels in certain aspects is controlled by the CF.

FIG. 13 illustrates an example of mappings 1300 utilized by wireless devices to determine a next hop destination to forward a packet in a per-UE routing scheme, in accordance with certain aspects of the present disclosure. For example, mappings 1304, 1322, and 1306 may refer to the mappings stored at DUs, 804, 822, and 806, respectively, of RAN 800A. In certain aspects, LCID1 of C-RNTI1 corresponds to an identifier of a radio bearer of a radio link associated with DU 804; LCID2 of C-RNTI2 corresponds to an identifier of a radio bearer of a radio link associated with DU 822; LCID3 of C-RNTI3 corresponds to an identifier of a radio bearer of a radio link associated with DU 806; and LCIDC of C-RNTIC corresponds to an identifier of a radio bearer of a radio link associated with CU 802.

In certain aspects, for a UL packet, DU 806 receives a packet wirelessly from UE 808. As discussed, the UE 808 may include in the packet a header with a UID of the UE 808 and a routing label (e.g., R3) that is associated with CU 802. The UID and routing label may be assigned to the UE 808 by the CF 810. Further, DU 806 utilizes mapping 1306 stored at DU 806 to determine a next hop to forward the packet based on both the UID and the routing label included in the header of the packet. For example, in per-UE routing, for the DU 806 that is the endpoint in communication with the UE 808, the UID in addition to the routing label is used to determine the next hop.

In certain aspects, the DU 806 further utilizes the link direction (e.g., UL or DL) of the packet to determine the next hop. For example, if the packet includes the routing label R3, UID of UE 808, and the packet is a UL packet, the DU 806 maps the routing label R3 and UID of UE 808 to LCID2 of C-RNTI2 associated with DU 822 based on mapping 1306. Accordingly, the DU 806 wirelessly transmits the packet with the routing label R3 and UID of UE 808 on LCID2 of C-RNTI2.

In certain aspects, the mappings 1306, 1322, and 1304 optionally (as shown) includes a cell identifier (cell ID) for each entry in the mappings 1306, 1322, and 1304, similar to as discussed with respect to mappings 906, 922, and 904. For example, if the packet includes the routing label R3 , UID of UE 808, and the packet is a UL packet, and the cell ID is 1, the DU 806 maps the routing label R3 and UID of UE 808 to LCID2 of C-RNTI2 associated with DU 822 based on mapping 1306.

DU 822 receives the packet from DU 806 on LCID2 of C-RNTI2. DU 822 maps the routing label R3 and UL direction for the packet to LCID1 of C-RNTI1 associated with DU 804 based on mapping 1322. Accordingly, the DU 822 wirelessly transmits the packet with the routing label R3 and UID of UE 808 on LCID1 of C-RNTI1. DU 804 receives the packet from DU 822 on LCID1 of C-RNTI1. DU 804 maps the routing label R3 and UL direction for the packet to LCIDC of C-RNTIC associated with CU 802 based on mapping 1304. Accordingly, the DU 804 wirelessly transmits the packet with the routing label R3 and UID of UE 808 on LCIDC of C-RNTIC. CU 802 receives the packet from DU 804 on LCID1 of C-RNTI1 and processes the packet.

In certain aspects, for a DL packet, DU 804 receives a packet wirelessly from CU 802. As discussed, the CU 802 may include in the packet a header with a routing label (e.g., R3) that is associated with UE 808 and the UID of UE 808. Further, DU 804 utilizes mapping 804 stored at DU 804 to determine a next hop to forward the packet based on the routing label included in the header of the packet. In certain aspects, the DU 804 further utilizes the link direction (e.g., UL or DL) of the packet to determine the next hop. For example, if the packet includes the routing label R3, and the packet is a DL packet, the DU 804 maps the routing label R3 to LCID2 of C-RNTI2 associated with DU 822 based on mapping 1304. Accordingly, the DU 804 wirelessly transmits the packet with the routing label R3 and UID of UE 808 on LCID2 of C-RNTI2.

DU 822 receives the packet from DU 804 on LCID2 of C-RNTI2. DU 822 maps the routing label R3 and DL direction for the packet to LCID3 of C-RNTI3 associated with DU 806 based on mapping 1322. Accordingly, the DU 822 wirelessly transmits the packet with the routing label R3 and UID of UE 808 on LCID3 of C-RNTI3. DU 806 receives the packet from DU 822 on LCID3 of C-RNTI3. DU 806, as the last hop before UE 808, transmits the packet to UE 808.

In certain aspects, per-UE routing may use similar procedures for adding a wireless relay/updating mappings as described with respect to FIG. 10. For example, when a new UE is attached to the network via a fronthaul path including DUs, all the mappings for the UE of all of the DUs in the fronthaul may be updated by the CF.

In certain aspects, instead of per-UE routing, per-flow routing may be used. In per-flow routing, multiple UIDs may be assigned to a single UE, each UID corresponding to a different set or class of flows. Accordingly, the different UIDs in the packets can be used for different flows, which may be mapped to different routing paths, even for a single UE.

In certain aspects, instead of per-UE routing, opportunistic route table population may be used. Opportunistic route table population is similar to per-UE routing and may utilize the same mappings 1300 and procedures to determine the next hop destination. However, in certain aspects, the procedures for adding a wireless relay/updating mappings may be different. For example, when a new DU is added to the fronthaul, instead of all the mappings of all of the DUs in the fronthaul being updated, only the new DU and the immediate neighbor(s) of the new DU are updated. Then, when one of the DUs not updated receives a packet with a routing label that the DU does not have a mapping entry stored in its mapping, the DU itself may make the next hop decision and add a mapping entry corresponding the to the next hop decision, without configuration by the CF. This may reduce the amount of data transferred between devices for configuration.

For example, if a DU receives a packet with a routing label (e.g., R3) that is does not have a corresponding entry in the mapping of the DU, the DU may determine a next hop to send the packet (e.g., based on the link direction UL or DL) to its destination. For example, the DU may already have a security association with another DU to relay packets to the other DU. Accordingly, the DU may select the other DU as the next hop, and include an entry in the mapping at the DU of the routing label to the C-RNTI(s) and LCID(s) of the other DU.

Figure 14:
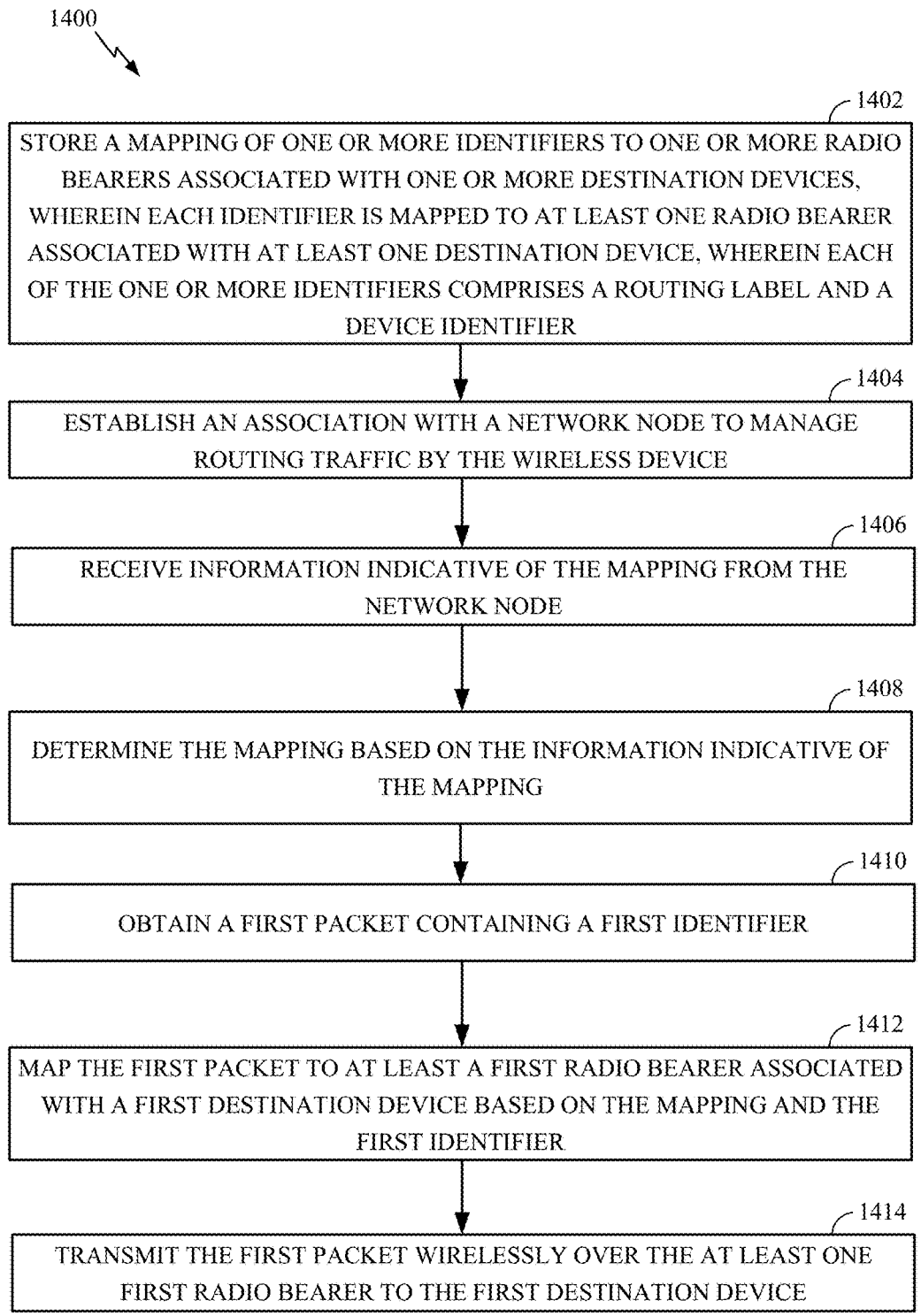
FIG. 14 illustrates example operations for wirelessly routing packets, in accordance with certain aspects of the present disclosure.

FIG. 14 illustrates example operations 1400 for wirelessly routing packets. According to certain aspects, operations 1400 may be performed by a wireless relay device such as a UE, DU, gNB, CU, etc. (e.g., UE 808, DU 804, DU 806, CU 802, etc.).

Operations 1400 begin at 1402 where the wireless relay device stores a mapping of one or more identifiers (e.g., routing labels and/or UIDs) to one or more radio bearers associated with one or more destination devices, wherein each identifier is mapped to at least one radio bearer associated with at least one destination device, wherein each of the one or more identifiers comprises a routing label and a device identifier. At 1404, the wireless relay device establishes an association with a network node to manage routing traffic by the wireless relay device. At 1406, the wireless relay device receives information indicative of the mapping from the network node. At 1408, the wireless relay device determines the mapping based on the information indicative of the mapping.

At 1410, the wireless relay device obtains a first packet containing a first identifier. At 1412, the wireless relay device maps the first packet to at least a first radio bearer associated with a first destination device based on the mapping and the first identifier. At 1414, the wireless relay device transmits the first packet wirelessly over the at least one first radio bearer to the first destination device.

Figure 15:
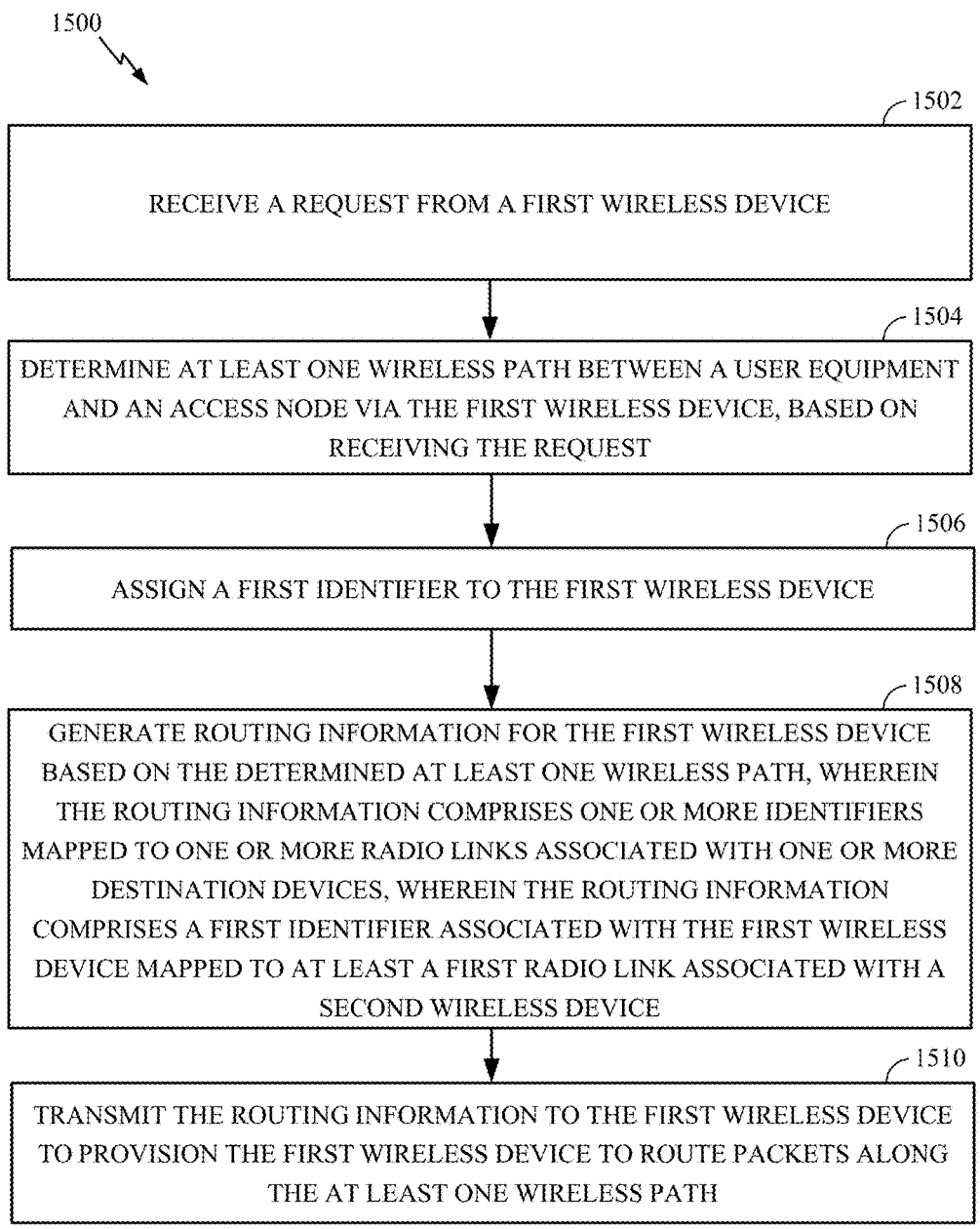
FIG. 15 illustrates example operations for configuring mappings at wireless devices, in accordance with certain aspects of the present disclosure.

FIG. 15 illustrates example operations 1500 for configuring mappings at wireless devices. According to certain aspects, operations 1500 may be performed by a CF (e.g., CF 810).

Operations 1500 begin at 1502 where the CF receives a request (e.g., relay addition or modification request) from a first wireless device. At 1504, the CF determines at least one wireless path between a user equipment and an access node (e.g., CU, gNB, etc.) via the first wireless device, based on receiving the request. At 1506, the CF assigns a first identifier (e.g., routing label and/or UID) to the first wireless device. At 1508, the CF generates routing information (e.g., mappings) for the first wireless device based on the determined at least one wireless path, wherein the routing information comprises one or more identifiers (e.g., routing labels and/or UIDs) mapped to one or more radio links (and optionally one or more radio bearers of the one or more radio links) associated with one or more destination devices, wherein the routing information comprises a first identifier associated with the first wireless device mapped to at least a first radio link associated with a second wireless device. At 1510, the CF transmits the routing information to the first wireless device to provision the first wireless device to route packets along the at least one wireless path.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for forwarding, and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for determining, means for assigning, means for generating, means for mapping, means for obtaining, means for allocating, and/or means for including may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 14 and 15.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A wireless device comprising:
a memory configured to:
store a mapping of one or more identifiers to one or more radio bearers associated with one or more destination devices, wherein each identifier is mapped to at least one radio bearer associated with at least one destination device, wherein each of the one or more identifiers comprises a routing label and a device identifier, wherein each routing label corresponds to at least a portion of a path between destination devices, wherein for two different destination devices there are multiple paths comprising a first path and a second path between the two different destination devices, wherein a first routing label corresponds to at least a portion of the first path and a second routing label corresponds to at least a portion of the second path; and
a processor coupled to the memory, the processor being configured to:
establish an association with a network node to manage routing traffic by the wireless device;
receive information indicative of the mapping from the network node;
determine the mapping based on the information indicative of the mapping;
obtain a first packet containing a first identifier;
map the first packet to at least a first radio bearer associated with a first destination device based on the mapping and the first identifier; and
transmit the first packet wirelessly over the at least one first radio bearer to the first destination device.

2. The wireless device of claim 1, wherein the mapping further comprises a mapping of the one or more identifiers to one or more radio links, wherein the one or more radio links are associated with the one or more radio bearers, wherein the information indicative of the mapping includes the mapping of the one or more identifiers to the one or more radio links, but not the mapping of the one or more identifiers to the one or more radio bearers, and wherein to determine the mapping comprises to determine the mapping of the one or more identifiers to the one or more radio bearers based on the mapping of the one or more identifiers to the one or more radio links and a quality of service requirement identifier included in the first packet.

3. The wireless device of claim 1, wherein the first identifier is mapped to the first radio bearer associated with the first destination device and a second identifier is mapped to a second radio bearer associated with a second destination device, wherein the processor is further configured to assign the first identifier to the first packet based on at least one of a load balancing procedure, a link quality between the wireless device and the first destination device, or a traffic type associated with the first packet.

4. The wireless device of claim 1, wherein the mapping further maps the first identifier to a second identifier, and wherein the processor is further configured to replace the first identifier with the second identifier before transmitting the first packet.

5. The wireless device of claim 1, wherein the first identifier is not included in the stored mapping, and wherein the processor is further configured to:
receive the first packet from a source device; and
add the first identifier to the mapping as mapped to at least the first radio bearer associated with the first destination device based on the mapping including a second identifier mapped to at least the first radio bearer associated with the first destination device, wherein the second identifier is associated with the source device.

6. The wireless device of claim 1, wherein the processor is further configured to receive the first packet over at least one second radio bearer, wherein the at least one second radio bearer is associated with a source device of the first packet.

7. The wireless device of claim 1, wherein the mapping comprises a mapping of the one or more identifiers to one or more cell radio network temporary identifiers and one or more logical channel identifiers.

8. The wireless device of claim 1, wherein the first identifier is mapped to the first radio bearer for a first quality of service, and wherein the first identifier is mapped to the first radio bearer and a second radio bearer for a second quality of service.

9. The wireless device of claim 1, wherein the processor is further configured to transmit to the network node a quality report of one or more radio links, wherein the information indicative of the mapping is based on the quality report.

10. A method for wirelessly routing packets at a wireless device, the method comprising:
storing a mapping of one or more identifiers to one or more radio bearers associated with one or more destination devices, wherein each identifier is mapped to at least one radio bearer associated with at least one destination device, wherein each of the one or more identifiers comprises a routing label and a device identifier, wherein each routing label corresponds to at least a portion of a path between destination devices, wherein for two different destination devices there are multiple paths comprising a first path and a second path between the two different destination devices, wherein a first routing label corresponds to at least a portion of the first path and a second routing label corresponds to at least a portion of the second path;
establishing an association with a network node to manage routing traffic by the wireless device;
receiving information indicative of the mapping from the network node;
determining the mapping based on the information indicative of the mapping;
obtaining a first packet containing a first identifier;
mapping the first packet to at least a first radio bearer associated with a first destination device based on the mapping and the first identifier; and
transmitting the first packet wirelessly over the at least one first radio bearer to the first destination device.

11. The method of claim 10, wherein the mapping further comprises a mapping of the one or more identifiers to one or more radio links, wherein the one or more radio links are associated with the one or more radio bearers, wherein the information indicative of the mapping includes the mapping of the one or more identifiers to the one or more radio links, but not the mapping of the one or more identifiers to the one or more radio bearers, and wherein determining the mapping comprises determining the mapping of the one or more identifiers to the one or more radio bearers based on the mapping of the one or more identifiers to the one or more radio links and a quality of service requirement identifier included in the first packet.

12. The method of claim 10, wherein the first identifier is mapped to the first radio bearer associated with the first destination device and a second identifier is mapped to a second radio bearer associated with a second destination device, and further comprising assigning the first identifier to the first packet based on at least one of a load balancing procedure, a link quality between the wireless device and the first destination device, or a traffic type associated with the first packet.

13. The method of claim 10, wherein the mapping further maps the first identifier to a second identifier, and further comprising replacing the first identifier with the second identifier before transmitting the first packet.

14. The method of claim 10, wherein the first identifier is not included in the stored mapping, and further comprising:
receiving the first packet from a source device; and
adding the first identifier to the mapping as mapped to at least the first radio bearer associated with the first destination device based on the mapping including a second identifier mapped to at least the first radio bearer associated with the first destination device, wherein the second identifier is associated with the source device.

15. The method of claim 10, further comprising receiving the first packet over at least one second radio bearer, wherein the at least one second radio bearer is associated with a source device of the first packet.

16. The method of claim 10, wherein the mapping comprises a mapping of the one or more identifiers to one or more cell radio network temporary identifiers and one or more logical channel identifiers.

17. The method of claim 10, wherein the first identifier is mapped to the first radio bearer for a first quality of service, and wherein the first identifier is mapped to the first radio bearer and a second radio bearer for a second quality of service.

18. The method of claim 10, further comprising transmitting to the network node a quality report of one or more radio links, wherein the information indicative of the mapping is based on the quality report.

19. A wireless device comprising:
means for storing a mapping of one or more identifiers to one or more radio bearers associated with one or more destination devices, wherein each identifier is mapped to at least one radio bearer associated with at least one destination device, wherein each of the one or more identifiers comprises a routing label and a device identifier, wherein each routing label corresponds to at least a portion of a path between destination devices, wherein for two different destination devices there are multiple paths comprising a first path and a second path between the two different destination devices, wherein a first routing label corresponds to at least a portion of the first path and a second routing label corresponds to at least a portion of the second path;

means for establishing an association with a network node to manage routing traffic by the wireless device;

means for receiving information indicative of the mapping from the network node;

means for determining the mapping based on the information indicative of the mapping;

means for obtaining a first packet containing a first identifier;

means for mapping the first packet to at least a first radio bearer associated with a first destination device based on the mapping and the first identifier; and means for transmitting the first packet wirelessly over the at least one first radio bearer to the first destination device.

20. The wireless device of claim 19, wherein the mapping further comprises a mapping of the one or more identifiers to one or more radio links, wherein the one or more radio links are associated with the one or more radio bearers, wherein the information indicative of the mapping includes the mapping of the one or more identifiers to the one or more radio links, but not the mapping of the one or more identifiers to the one or more radio bearers, and wherein means for determining the mapping comprises means for determining the mapping of the one or more identifiers to the one or more radio bearers based on the mapping of the one or more identifiers to the one or more radio links and a quality of service requirement identifier included in the first packet.

21. The wireless device of claim 19, wherein the first identifier is mapped to the first radio bearer associated with the first destination device and a second identifier is mapped to a second radio bearer associated with a second destination device, and further comprising means for assigning the first identifier to the first packet based on at least one of a load balancing procedure, a link quality between the wireless device and the first destination device, or a traffic type associated with the first packet.

22. The wireless device of claim 19, wherein the mapping further maps the first identifier to a second identifier, and further comprising means for replacing the first identifier with the second identifier before transmitting the first packet.

23. The wireless device of claim 19, wherein the first identifier is not included in the stored mapping, and further comprising:

means for receiving the first packet from a source device; and means for adding the first identifier to the mapping as mapped to at least the first radio bearer associated with the first destination device based on the mapping including a second identifier mapped to at least the first radio bearer associated with the first destination device, wherein the second identifier is associated with the source device.

24. The wireless device of claim 19, further comprising means for receiving the first packet over at least one second radio bearer, wherein the at least one second radio bearer is associated with a source device of the first packet.

25. A non-transitory computer readable medium having instructions stored thereon for performing a method for wirelessly routing packets by a wireless device, the method comprising:

storing a mapping of one or more identifiers to one or more radio bearers associated with one or more destination devices, wherein each identifier is mapped to at least one radio bearer associated with at least one destination device, wherein each of the one or more identifiers comprises a routing label and a device identifier, wherein each routing label corresponds to at least a portion of a path between destination devices, wherein for two different destination devices there are multiple paths comprising a first path and a second path between the two different destination devices, wherein a first routing label corresponds to at least a portion of the first path and a second routing label corresponds to at least a portion of the second path;

establishing an association with a network node to manage routing traffic by the wireless device;

receiving information indicative of the mapping from the network node;

determining the mapping based on the information indicative of the mapping;

obtaining a first packet containing a first identifier;

mapping the first packet to at least a first radio bearer associated with a first destination device based on the mapping and the first identifier; and transmitting the first packet wirelessly over the at least one first radio bearer to the first destination device.

26. The non-transitory computer readable medium of claim 25, wherein the mapping further comprises a mapping of the one or more identifiers to one or more radio links, wherein the one or more radio links are associated with the one or more radio bearers, wherein the information indicative of the mapping includes the mapping of the one or more identifiers to the one or more radio links, but not the mapping of the one or more identifiers to the one or more radio bearers, and wherein determining the mapping comprises determining the mapping of the one or more identifiers to the one or more radio bearers based on the mapping of the one or more identifiers to the one or more radio links and a quality of service requirement identifier included in the first packet.

27. The non-transitory computer readable medium of claim 25, wherein the first identifier is mapped to the first radio bearer associated with the first destination device and a second identifier is mapped to a second radio bearer associated with a second destination device, wherein the method further comprises assigning the first identifier to the first packet based on at least one of a load balancing procedure, a link quality between the wireless device and the first destination device, or a traffic type associated with the first packet.

28. The non-transitory computer readable medium of claim 25, wherein the mapping further maps the first identifier to a second identifier, and wherein the method further comprises replacing the first identifier with the second identifier before transmitting the first packet.

29. The non-transitory computer readable medium of claim 25, wherein the first identifier is not included in the stored mapping, and wherein the method further comprises:

receiving the first packet from a source device; and adding the first identifier to the mapping as mapped to at least the first radio bearer associated with the first destination device based on the mapping including a second identifier mapped to at least the first radio bearer associated with the first destination device, wherein the second identifier is associated with the source device.

30. The non-transitory computer readable medium of claim 25, wherein the method further comprises receiving the first packet over at least one second radio bearer, wherein the at least one second radio bearer is associated with a source device of the first packet.

\* \* \* \* \*